US008658555B1

(12) United States Patent
Bandosz et al.

(10) Patent No.: US 8,658,555 B1
(45) Date of Patent: Feb. 25, 2014

(54) COMPOSITIONS COMPRISING ZIRCONIUM HYDROXIDE AND GRAPHITE OXIDE AND METHODS FOR USE

(75) Inventors: Teresa J. Bandosz, Teaneck, NY (US); Mykola Seredych, New York, NY (US); Gregory W. Peterson, Belcamp, MD (US); Christopher J. Karwacki, Churchville, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 136 days.

(21) Appl. No.: 13/289,156

(22) Filed: Nov. 4, 2011

Related U.S. Application Data

(60) Provisional application No. 61/422,345, filed on Dec. 13, 2010.

(51) Int. Cl.
  *B01J 8/00* (2006.01)
  *B01J 23/00* (2006.01)
  *C01B 7/00* (2006.01)
  *C01B 17/00* (2006.01)
  *C01B 31/08* (2006.01)
  *B01D 53/52* (2006.01)
  *B01D 53/56* (2006.01)
  *B01D 53/86* (2006.01)

(52) U.S. Cl.
  USPC ............ 502/182; 502/349; 502/419; 502/423; 423/242.1; 423/244.01; 423/448

(58) Field of Classification Search
  USPC ................. 502/182, 349, 417, 423; 423/448, 423/242.1, 244.01
  See application file for complete search history.

(56) References Cited

U.S. PATENT DOCUMENTS

| | | | | |
|---|---|---|---|---|
| 3,759,842 A | * | 9/1973 | Bianchi et al. | 502/101 |
| 3,998,270 A | * | 12/1976 | Rodewald | 166/275 |
| 2006/0019162 A1 | * | 1/2006 | Shirahige et al. | 429/218.2 |
| 2007/0281854 A1 | * | 12/2007 | Harbour et al. | 502/156 |
| 2011/0256014 A1 | * | 10/2011 | Hong et al. | 419/11 |

FOREIGN PATENT DOCUMENTS

JP  2003-192316  *  7/2009  ............ C01B 31/00

OTHER PUBLICATIONS

"Involvement of water and visible light in the enhancement in SO2 adsorption at ambient conditions on the surface of zinc (hydr)oxide/graphite oxide composites," Mykola Seredych et al. Chemical Engineering Journal 223 (2013), pp. 442-453.*
"Reactive adsorption of hydrogen sulfide on graphite oxide/Zr(OH)4 composites," Mykola Seredych et al. Chemical Engineering Journal 166 (2011), pp. 1032-1038.*
"Effects of Surface Features on Adsorption of SO2 on Graphite Oxide/Zr(OH)4 Composites," Mykola Seredych et al. J. Phys. Chem. C 2010, 114, pp. 14552-14560.*
"Adsorption of ammonia on graphite oxide/aluminiu, polycation and graphite oxide/zirconium-aluminium polyoxycation composites," Mykola Seredych et al. Journal of Colloid and Interface Science 324 (2008), pp. 25-35.*

(Continued)

*Primary Examiner* — Patricia L Hailey
(74) *Attorney, Agent, or Firm* — Ulysses John Biffoni

(57) ABSTRACT

Compositions and methods useful for removing toxic industrial compounds from air are disclosed, wherein said composition comprises a mixture of hydrous metal oxide and graphite oxide. In a most preferred embodiment the composition comprises a mixture of zirconium hydroxide and graphene oxide.

32 Claims, 14 Drawing Sheets

(56) References Cited

OTHER PUBLICATIONS

"Graphene oxide/ferric hydroxide composites for efficient arsenate removal from drinking water," Kai Zhang et al. Journal of Hazardous Materials 182 (2010), pp. 162-168.*

"Nanocomposites of graphene oxide-hydrated zirconium oxide for simultaneous removal of As(III) and As(V) from water," Xubiao Luo et al. Chemical Engineering Journal 220 (2013), pp. 98-106.*

"Adsorptive removal of phosphate ions from aqueous solution using zirconia-functionalized graphite oxide," Enmin Zong et al. Chemical Engineering Journal 221 (2013), pp. 193-203.*

* cited by examiner

COMPOSITIONS COMPRISING ZIRCONIUM HYDROXIDE AND GRAPHITE OXIDE AND METHODS FOR USE

CROSS-REFERENCE TO RELATED APPLICATIONS

This application claims priority from U.S. Provisional Application Ser. No. 61/422,345, filed Dec. 13, 2010.

GOVERNMENT INTEREST

The invention described herein may be manufactured, used and licensed by or for the U.S. Government.

FIELD OF THE INVENTION

The present invention relates to materials useful for protecting against toxic industrial compounds, and more particularly to compositions and methods for removing toxic industrial compounds from air.

BACKGROUND OF THE INVENTION

Toxic industrial compounds (TICs) encompass a variety of chemicals used or created by industry that can pose significant danger on human health if released in the air. Such toxic industrial compounds include ammonia ($NH_3$), nitrogen oxide ($NO_x$), hydrogen sulfide ($H_2S$), sulfur dioxide ($SO_2$), arsine ($AsH_3$), and the like. Hydrogen sulfide is one of the major environmental pollutants having its sources in natural and anthropogenic activity. Therefore, removal of TICs such as hydrogen sulfide and sulfur dioxide is important from both environmental (e.g., acid raid) and safe respiratory standpoints.

One method for removing TICs such as hydrogen sulfide and sulfur dioxide is reactive adsorption. Reactive adsorption is a form of adsorption which is enhanced through promotion of chemical reactions useful for changing an adsorbed molecule to a different one. These reactions may involve oxidation, reacting adsorbed molecules with one another or with the adsorbent surface, or with molecules present on the adsorbent surface.

Various materials have been extensively investigated for use as reactive adsorbents or adsorbent supports. Examples include activated carbons, fly ash, activated carbon fibers surface, sewage sludge based adsorbents, zinc oxide, exfoliated graphite, and porous basic inorganic materials. Important factors for promoting enhanced adsorption capacity of materials are high distribution of catalytic centers promoting oxidation and ability to retain water. Other important factors include efficiency at ambient temperatures and ability to withstand the presence of moisture. Current adsorption materials are inadequate due to limited adsorption capacity especially at ambient conditions and relatively weak adsorption forces.

Accordingly, there is a need in the art to develop materials exhibiting enhanced adsorption capacity for removing significant quantities of TICs from air and strong adsorption forces at levels sufficient for preventing desorption from the surface of such materials. There is a further need for such materials capable of operating at ambient conditions.

SUMMARY OF THE INVENTION

The present invention relates generally to compositions and methods for removing toxic industrial compounds from air. Broadly, the present composition includes a mixture of hydrous metal oxide and graphite oxide. Preferably, the hydrous metal oxide is hydrous zirconia. The present composition exhibits enhanced concentrations of highly dispersed active surface function groups (e.g., hydroxyl groups). In one embodiment of the present invention, the present composition is synthesized from zirconium chloride and graphite oxide. The present composition exhibits unique synergistic properties based on surface chemistry, porosity and enhanced adsorption capacity of toxic industrial compounds, particularly acidic gases such as sulfur dioxide and hydrogen sulfide. The composition of the present invention can be readily adapted for use in various applications requiring decontamination of air streams containing TICs such as sulfur dioxide and hydrogen sulfide, and especially for use in respiratory filtration applications.

In the present invention, the hydrous metal oxide of the present compositions is selected from a compound containing at least one metal element capable of dissociating adsorbed molecular water and generating hydroxyl groups, which chemically bond to the surface thereof. The hydrous metal oxide preferably possesses an amorphous structure, consisting of less than 10 nm crystals, which provides for formation of elevated concentrations of surface bound hydroxyl groups. In a preferred embodiment of the present invention, the composition is prepared as a porous mixture composed of hydrous zirconia and graphite oxide. In a more preferred embodiment of the present invention, the graphite oxide is graphene oxide.

In one aspect of the present invention, there is provided a composition, which includes a mixture of hydrous metal oxide and graphite oxide.

In another aspect of the present invention, there is provided a method of making a composition, wherein the method includes the step of forming a mixture of hydrous metal oxide and graphite oxide.

In another aspect of the present invention, there is provided a method of removing toxic industrial compounds from air, wherein the method includes the step of passing the air in contact with a composition comprising a mixture of hydrous metal oxide and graphite oxide.

BRIEF DESCRIPTION OF THE DRAWINGS

The following drawings are illustrative of embodiments of the invention and are not intended to limit the invention as encompassed by the claims forming part of the invention.

DETAILED DESCRIPTION OF THE INVENTION

Figure 1A:
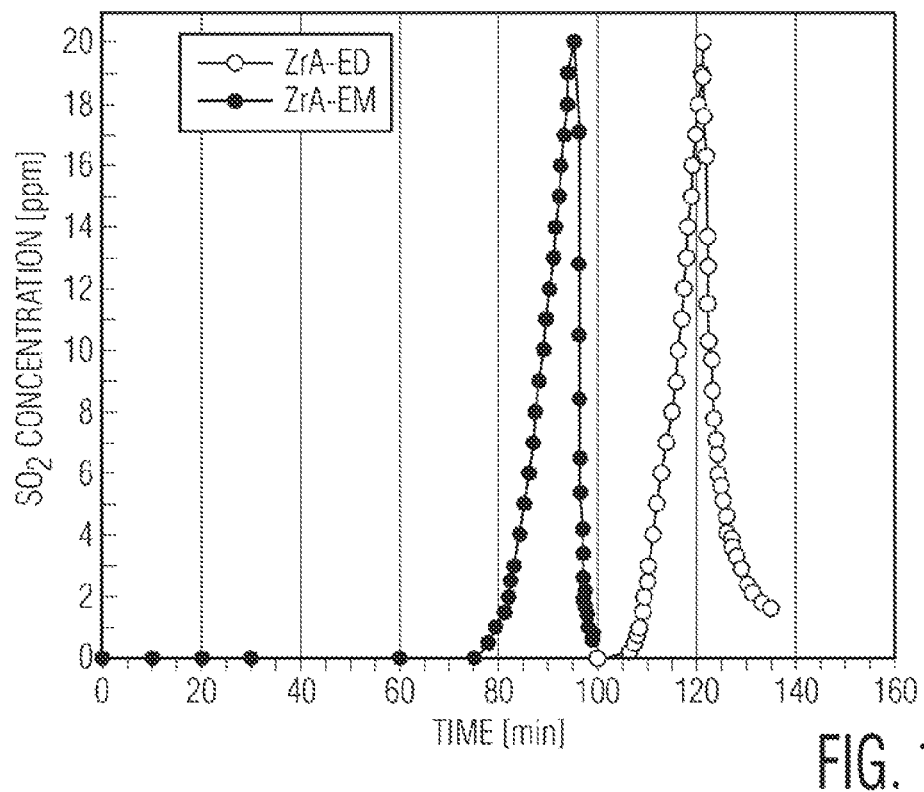
FIGS. 1A and 1B show breakthrough and desorption curves for sulfur dioxide obtained on samples of the present compositions in accordance with the present invention.

The present invention is directed to compositions and methods for removing toxic industrial compounds (TICs) from air. The present composition has been observed to exhibit reactive adsorbent activity useful for removing toxic industrial compounds, preferably acid gases such as sulfur dioxide and hydrogen sulfide, from air. The present invention is formulated particularly for adsorbing TICs in significant quantities from air, and exhibiting strong adsorption forces at levels sufficient to prevent desorption from the surface.

The present invention exhibits enhanced concentrations of highly dispersed active surface function groups (e.g., hydroxyl groups). The present invention further exhibits unique synergistic properties based on surface chemistry, porosity and enhanced adsorption capacity of toxic industrial compounds. The composition of the present invention can be readily adapted for use in various applications requiring decontamination of air streams containing TICs such as sulfur dioxide and hydrogen sulfide, and especially for use in respiratory filtration applications. There is also provided a method for making the present invention.

Broadly, the present composition includes a mixture of hydrous metal oxide and graphite oxide. The hydrous metal oxide of the present composition is selected from a compound containing at least one metal element capable of dissociating adsorbed molecular water and generating hydroxyl groups, which chemically bond to the surface thereof. The hydrous metal oxide preferably possesses an amorphous structure, consisting of less than 10 nm crystals, which provides for formation of elevated concentrations of surface bound hydroxyl groups. Preferably, the hydrous metal oxide is hydrous zirconia.

The addition of graphite oxide has been observed to enhance the TIC removal activity of the composition under both dry and moist conditions as compared to hydrous metal oxide alone. It is believed that the presence of the graphite oxide component reduces the tendency of the surface to adsorb water, which would otherwise diminish the capacity of the hydrous metal oxide to remove TICs. Applicants theorize that the enhanced activity is linked to the bridging of the —OH groups of the graphite oxide with the hydrous metal oxide (e.g., $Zr(OH)_4$) lattice and reactions of the metal (e.g., zirconium) with acidic groups present on the edges of the graphite oxide component. The TICs are retained on the surface via physical adsorption in small pores and via reactions with terminal —OH groups of the hydrous metal oxide (e.g., hydrous zirconia). The latter reaction results in the formation of less toxic by-products (e.g., sulfides and sulfates).

In one embodiment of the present invention, the composition includes a mixture composed of hydrous zirconia and graphite oxide. In a further embodiment of the present invention, the present composition is synthesized from zirconium chloride and graphite oxide. In a more preferred embodiment of the present invention, the graphite oxide is graphene oxide.

Depending on the type of process in which the present composition is used, the porous mixture can be in any form including, for example, pellets, monoliths, powders, beds, and the like, which are suitable for promoting maximum contact with air flowing or passing therethrough. Preferably, the porous mixture of the present invention exhibits high micro- and/or meso-pore volume to achieve increased overall surface area.

The graphite oxide is present in an amount sufficient to substantially enhance removal of the TICs such as sulfur dioxide and hydrogen sulfide under dry and moist conditions. In a preferred embodiment of the present invention, the amount of the graphite oxide present is at least 0.01% by weight based on the total weight of the composition, and preferably in the range of from about 0.1% by weight to 90% by weight based on the total weight of the composition, and more preferably from about 1% by weight to 80% by weight based on the total weight of the composition. In a further preferred embodiment of the present invention, the amount of graphite oxide is from about 5% by weight to 50% by weight based on the total weight of the composition.

The graphite oxide is incorporated or loaded into the composition with hydrous metal oxide to yield a porous mixture. The resulting porous mixture may be mesoporous (i.e., pore sizes of less than 50 nm) or microporous (i.e., pore sizes of less than 2 nm). The crystal size of the hydrous metal oxide is less than 100 nm, preferably less than 10 nm, and more preferably less than 2 nm.

In a preferred embodiment of the present invention, the porous mixture of the present composition has a surface area above about 100 $m^2g^{-1}$, preferably from about 100 $m^2g^{-1}$ to 1000 $m^2g^{-1}$, and most preferably from about 200 $m^2g^{-1}$ to 600 $m^2g^{-1}$.

In a preferred embodiment of the present invention, the total pore volume of the porous mixture is generally at least 0.01 $cm^3g^{-1}$, preferably in the range of from about 0.01 $cm^3g^{-1}$ to 0.8 $cm^3g^{-1}$ and more preferably from about 0.1 $cm^3g^{-1}$ to 0.5 $cm^3g^{-1}$.

In a preferred embodiment of the present invention, the micropore volume of the porous mixture is generally at least 0.01 cm$^3$g$^{-1}$, preferably in the range of from about 0.03 cm$^3$g$^{-1}$ to 0.1 cm$^3$g$^{-1}$, and more preferably from about 0.03 cm$^3$g$^{-1}$ to 0.06 cm$^3$g$^{-1}$.

In a preferred embodiment of the present invention, the mesopore volume of the porous mixture is generally at least 0.01 cm$^3$g$^{-1}$, preferably in the range of from about 0.05 cm$^3$g$^{-1}$ to 0.5 cm$^3$g$^{-1}$, and more preferably from about 0.06 cm$^3$g$^{-1}$ to 0.1 cm$^3$g$^{-1}$.

In a preferred embodiment of the present invention, the breakthrough capacity or adsorption capacity of the porous mixture is generally at least 10 mg/g, preferably in the range of from about 30 mg/g to 300 mg/g, and more preferably from about 50 mg/g to 300 mg/g.

In a preferred embodiment of the present invention, the porous mixture has a pH value of from about 3 to 9, and more preferably from about 6 to 7.

In the present invention, the hydrous metal oxide of the porous mixture is selected from a compound containing at least one metal element in a hydroxylated state capable of forming and supporting hydroxyl groups dispersed on the surface thereof. The hydrous metal oxide is preferably amorphous in structure.

The metal element of the hydrous metal oxide is selected from transition metals such as, for example, titanium, post-transition metals such as, for example, aluminum, silicon, zirconium, cerium, and hafnium, and combinations thereof. Preferably, the metal element is zirconium. A preferred example of suitable hydrous metal oxides is hydrous zirconia, which has been observed to provide enhanced porosity and surface area useful for forming and supporting higher concentration of hydroxyl surface groups.

The hydrous metal oxide of the present invention has a hydroxyl concentration in the range of from about 0.1 to 0.6 surface fraction based on the total available surface of the present composition, and more preferably from about 0.3 to 0.5 surface fraction based on the total available surface of the present composition.

For purposes of the present invention, it will be understood by those of ordinary skill in the art that the terms "sufficient" and "effective" as used in conjunction with the terms "amount" and "conditions" represents a quantitative value that provides a satisfactory and desired result, e.g., detoxifying or neutralizing toxic industrial chemicals such as sulfur dioxide and hydrogen sulfide which may be present in an air stream. The amounts, conditions and volume required to achieve the desired result will, of course, vary somewhat based upon the amount of toxic industrial chemical present, temperature, the flow rate, and volume of the air stream.

In another embodiment of the present invention, there is provided a method of making a composition, wherein the method includes the step of forming a mixture of hydrous metal oxide and graphite oxide. It will be understood that the method for making the present composition is not limited to the examples provided herein, and is intended to encompass any methods or processes suitable for producing a mixture of hydrous metal oxide such as hydrous zirconia, and graphite oxide.

By way of example, the present composition may be prepared by synthesizing graphite oxide via the Hummers method. Graphite oxide was produced by treating graphite with essentially a water-free mixture of concentrated sulfuric acid, sodium nitrate and potassium permanganate at temperatures of about less than 45° C. for about less than two hours. Specific details of the Hummers method can be found in William S. Hummers, Jr., and Richard E. Offeman, (1958), *Preparation of Graphitic Oxide*, J. American Chemical Society, volume 80 issue 6, page 1339, the contents of which are incorporated herein by reference in the entirety. Alternatively, graphite oxide is also commercially available from Sigma-Aldrich of St. Louis, Mo.

In an exemplary embodiment of the present invention, graphite oxide was dispersed in a solution of a zirconium salt (e.g., zirconium chloride). Thereafter, a basic solution (e.g., sodium hydroxide) was added slowly in a stoichiometric amount to yield a precipitate comprising zirconium hydroxide and graphite oxide.

In a further exemplary embodiment of the present invention, the graphite oxide prepared via the Hummers method in the form of a powder was dispersed in 1.0 L of sodium hydroxide (0.05M) to yield a suspension of graphite oxide. The resulting suspension was thereafter stirred for about three hours. A solution of zirconium (IV) chloride (0.05M) in an amount of about 250 mL was added by titration at a rate of about 0.6 mL/min to the suspension of graphite oxide using a Titronic Universal manufactured by Schott Instruments GmbH of Mainz, Germany. The resulting suspension was extensively washed with distilled water until neutral pH was reached and no chloride ions were detected. The suspension was centrifuged and dried at about 50° C. for about 48 hours to yield the final product.

In another embodiment of the present invention, there is provided a method of removing toxic industrial compounds such as sulfur dioxide and hydrogen sulfide from air, wherein the method includes the step of passing the air in contact with a composition comprising a mixture of hydrous metal oxide and graphite oxide. The composition may be provided with a relatively high surface area. A TIC containing air stream is passed at a suitable flow rate in contact with the mixture, while maintaining the temperature of the mixture within an optimal range.

The compositions of the present invention can be implemented or employed in various suitable arrangements of process conditions, depending upon the nature of the air to be purified. It will be understood that the present invention is not limited to the detoxification, neutralization or decontamination of sulfur dioxide and hydrogen sulfide, and may encompass the detoxification, neutralization or decontamination of any toxic industrial compounds in the air through contact with the graphite oxide and hydrous metal oxide combination to produce a reaction product that is less toxic and safer than the initial toxic industrial compounds. Mere physical contact of the toxic industrial compound with the present composition is sufficient to initiate the decontamination process.

The composition of the present invention is useful in greatly reducing or eliminating toxic industrial compounds from air passing in contact therewith and as a result generating less toxic products. In a preferred embodiment of the present invention, the present composition is used to reactively adsorb sulfur dioxide and hydrogen sulfide to yield less harmful compounds. The conditions required for carrying out the claimed methods can generally be described as ambient environmental conditions. For example, the methods can be used preferably at temperatures ranging from about 25° C. to about 150° C.

EXAMPLES

The following examples serve to provide further appreciation of the invention but are not meant in any way to restrict the effective scope of the invention.

Example 1

Preparation of Zirconium Hydroxide and Graphite Oxide Composition

Graphite oxide (GO) was synthesized by oxidation of graphite using the Hummers method, whereby graphite is treated with essentially a water-free mixture of concentrated sulfuric acid, sodium nitrate and potassium permanganate at temperatures of about less than 45° C. for about less than two hours. The resulting graphite oxide powder was dispersed in amounts of 5 wt %, 20 wt %, and 50 wt % based on the final mass of the material, respectively, in corresponding 1.0 L of 0.05 M sodium hydroxide. The resulting suspensions were subsequently each stirred for about 3 hours.

Thereafter, about 250 mL of 0.05 M zirconium (IV) chloride was added each of the dispersed graphite oxide suspensions at a rate of about 0.6 mL/min using a Titronic Universal (SCHOTT). The resulting product was extensively washed with distilled water until neutral pH is achieved and no traces of chloride ion were observed in the suspension. Finally, the suspension was centrifuged and gel formed was dried at about 50° C. for about 48 hours. Samples of zirconium hydroxide were prepared in the same manner, however without graphite oxide dispersed in the sodium hydroxide solution.

As used herein, the graphite oxide obtained using Hummers methods is referred to hereinafter as "GO" and zirconium hydroxide (hydrous zirconia) as "ZrA." The compositions produced with 5 wt %, 20 wt % and 50 wt % of GO are referred to hereinafter as ZrG-1, ZrG-2 and ZrG-3, respectively.

Example 2

Experimental Data Associated with Adsorption of $SO_2$ Using Graphite Oxide/$Zr(OH)_4$ Composition Compositions comprising zirconium hydroxide and graphite oxide were analyzed for adsorption activity on sulfur dioxide at ambient conditions. The results indicated enhanced adsorption of sulfur dioxide in the present composition due to formation of new basic sites and porosity derived from interaction between zirconium hydroxide and oxygen groups attached to graphene layers. The combination of physical adsorption and reactive adsorption of sulfur dioxide promotes the retention process and the resulting formation of sulfites, while the graphene component promotes catalytic oxidation of sulfur dioxide to sulfates.

Materials:

The materials prepared in Example 1 were studied as adsorbents for sulfur dioxide in the dynamic tests described below under dry (D) and wet conditions (M). After the concentration of $SO_2$ in the effluent gas reached 20 ppm the samples were considered as exhausted for sulfur dioxide adsorption. Such samples are identified with letter "E" added to their names.

Methods:

Sulfur Dioxide Breakthrough

Dynamic tests for evaluating $SO_2$ breakthrough capacity were carried out at room temperature to evaluate the capacity of the adsorbents for $SO_2$ removal under two sets of conditions, wet and dry. For the former, adsorbent samples were packed into a glass column (internal diameter 9 mm). A bed volume used was 1.2 $cm^3$ (with the mass of adsorbent between 1.27 g to 1.45 g). Before the experiments in moist air the samples were prehumidified with moist air (relative humidity 70% at 25° C.) for about two hours. The amount of water adsorbed was estimated from the increase in the sample weight.

Dry or moist air (relative humidity 70% at 25° C.) containing 0.1% (1,000 ppm) $SO_2$ was then passed through the column of adsorbent at 500 mL/min. The breakthrough of $SO_2$ was monitored using a MultiRae Plus monitoring system with an electrochemical sensor. The test was stopped at the breakthrough concentration of 20 ppm (sensor limit). The adsorption capacities of each adsorbent in terms of g of $SO_2$ per g of carbon were calculated by integration of the area above the breakthrough curves, and from the $SO_2$ concentration in the inlet gas, flow rate, breakthrough time, and mass of adsorbent. For each sample the $SO_2$ test was repeated at least twice. The determined capacities agreed to within 4%.

The dynamic tests were repeated with the experimental conditions maintained the same as those in the wet run except for the absence of water vapor to determine the capacity of the dry adsorbent. The samples run in dry are referred to with the letter designation "D" and those run in moist conditions with the letter designation "M".

The amount of weakly adsorbed $SO_2$ was evaluated by purging the adsorbent column with air at about 450 mL/min immediately after the breakthrough experiment. The $SO_2$ concentration was monitored until its concentration dropped to about 1 ppm.

Nitrogen Adsorption

Nitrogen adsorption isotherms were measured using an ASAP 2010 analyzer available commercially from Micromeritics of Norcross, Ga., at about −196° C. Before the experiment, the samples were degassed at about 120° C. to a constant pressure of about $10^{-4}$ Torr. The isotherms were used to calculate the specific surface area ($S_{BET}$), micropore volume ($V_{mic}$), total pore volume ($V_t$) and pore size distribution. The micropore volume was calculated using Dubinin-Radushkevich approach and the total pore volume seen by the nitrogen molecules, from the last point of the isotherms based on the volume of nitrogen adsorbed. The volume of mesopores ($V_{mes}$) represents the different between those two values. The relative microporosity was calculated as the ratio of the micropore volume to the total pore volume.

pH of the Surface

A 0.1 g sample of dry adsorbent was added to 5 mL of deionized water and the suspension stirred overnight to reach equilibrium. The sample was filtered and the pH of solution was measured using an Accumet Basic pH meter available commercially from Fisher Scientific of Springfield, N.J.

Thermal Analysis

Thermal analysis was carried out using TA Instruments Thermal Analyzer available commercially from New Castle, Del. The heating rate was about 10° C./min in a nitrogen atmosphere at about 100 mL/min flow rate. The samples were heated up to 1000° C.

Scanning Electron Microscopy

Scanning electron microscopy (SEM) images were obtained using a Zeiss Supra 55 VP with an accelerating voltage of 5.00 kV. Scanning was performed on a sample powder previously dried (120° C.) and sputter coated with a gold to avoid charging.

Elemental Analysis

The content of sulfur was evaluated using X-ray fluorescence (SPECTRO model 300T Benchtop Analyzer available commercially from ASOMA Instruments, Inc. of Marbles Falls, Tex.) based on the calibration curve done for the samples with the internal standard of sulfur. The instrument has a titanium target X-ray tube and a high-resolution detector.

Fourier Transform Infrared (FTIR) Spectroscopy

FTIR spectroscopy was carried out using a Nicolet Magna-IR 830 spectrometer using the attenuated total reflectance (ATR) method. The spectrum was generated and collected 16 times and corrected for the background noise. The experiments were done on the powdered samples, without KBr addition.

Potentiometric Titration

Potentiometric titration measurements were performed with a DMS Titrino 716 automatic titrator available from Metrohm Park Inc. of Houston, Tex. The instrument was set at the mode where the equilibrium pH is collected. Subsamples of the initial and exhausted materials (~0.100 g) were added to $NaNO_3$ (0.01 M, 50 mL) and placed in a container maintained at about 25° C. overnight for equilibrium. During the titration, to eliminate the influence of atmospheric $CO_2$, the suspension was continuously saturated with $N_2$. The suspension was stirred throughout the measurements. Volumetric standard NaOH (0.1 M) was used as the titrant. The experiments were done in the pH range of 3-10. Each sample was titrated with base after acidifying the sample suspension. No sharp changes in the slope were noticed which indicates the stability of the material in the experimental pH window.

The experimental data was transformed into a proton binding isotherm, Q, representing the total amount of protonated sites, which is related to the $pK_a$ distribution by the following integral equation:

$$Q(\text{pH}) = \int_{-\infty}^{\infty} q(\text{pH}, pK_a) f(pK_a) d pK_a \qquad (1)$$

The solution of equation (1) is obtained using the numerical procedure, which applies regularization combined with non-negativity constraints. Based on the spectrum of acidity constants and the history of the samples, the detailed surface chemistry was evaluated.

Figure 1B:
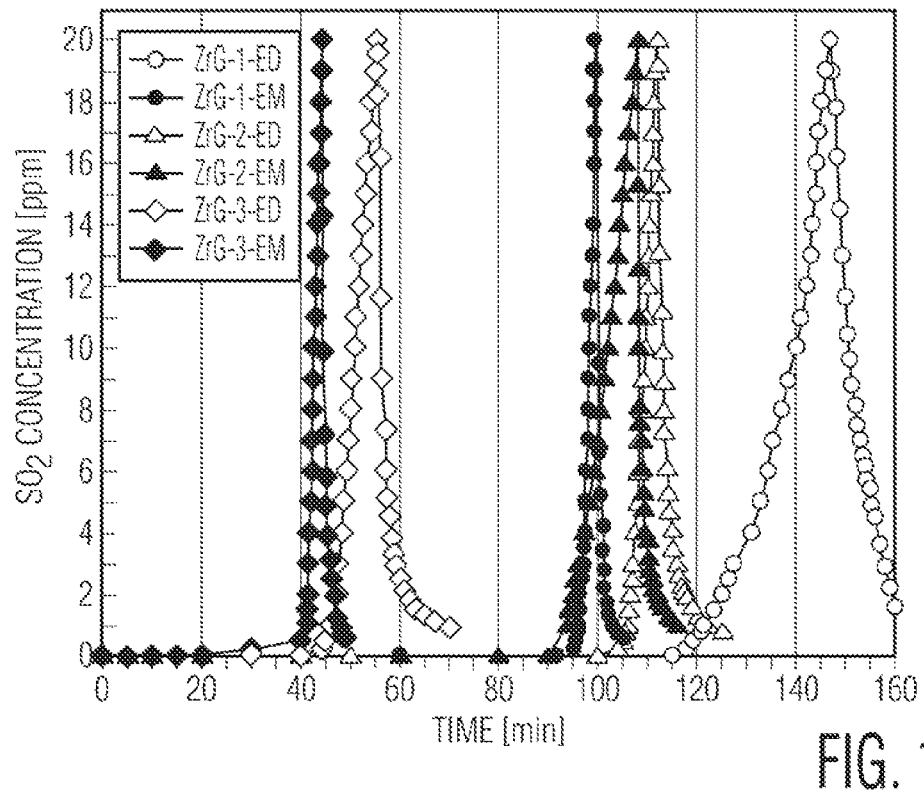

Results and Discussion:

The $SO_2$ breakthrough curves obtained on our adsorbents are collected in FIGS. 1A and 1B. It is noted that GO alone does not retain any sulfur dioxide. In the case of ZrA, water in the system has a detrimental effect on the adsorption capacity and the breakthrough is reached about 25 minutes earlier (¼ of the breakthrough time) compared to the experiment run in totally dry conditions. This suggests the competition between $SO_2$ and water for the adsorption centers. Formulating the compositions with 5 wt % or 20 wt % of GO increases the breakthrough time, especially in moist conditions. Less sensitivity towards the detrimental effect of water is also observed, especially for ZrG-2. A sharp decrease in the $SO_2$ concentration during air purging indicates a strong adsorption of sulfur dioxide in the case of all materials.

A list of calculated breakthrough capacities, amount of water preadsorbed, and surface pH values for initial and exhausted samples, is provided in Table 1 as follows.

TABLE 1

| Sample | $SO_2$ Breakthrough capacity [mg/g] | $SO_2$ Breakthrough capacity [mg/cm³] | $H_2O$ adsorbed [mg/g] | pH In | pH Exh |
|---|---|---|---|---|---|
| GO-ED | 0.0 | 0.0 | — | 2.62 | — |
| GO-EM | 0.0 | 0.0 | 96 | 2.62 | — |
| ZrA-ED | 116 | 147 | — | 6.58 | 4.51 |
| ZrA-EM | 83 | 106 | 88 | 6.58 | 5.02 |
| ZrG-1-ED | 146 | 178 | — | 7.38 | 4.45 |
| ZrG-1-EM | 99 | 120 | 86 | 7.38 | 5.61 |
| ZrG-2-ED | 112 | 136 | — | 6.85 | 4.76 |
| ZrG-2-EM | 106 | 128 | 75 | 6.85 | 5.06 |
| ZrG-3-ED | 59 | 71 | — | 6.04 | 4.92 |
| ZrG-3-EM | 50 | 57 | 84 | 6.04 | 5.20 |

The breakthrough capacities are reported per gram of an adsorbent and per a unit volume of the bed. The last values are important for practical applications. For ZrA and the compositions with 5 wt % and 20 wt % of GO these capacities are about 20% to 100% greater than those reported for commercial hydrous zirconia. Although the breakthrough concentration is higher in the present compositions, the steep rise of the breakthrough curves makes these differences not so significant. On the other hand, higher concentration of $SO_2$ makes our test more accelerated, which could result rather in underestimated, not overestimated, capacities.

Figure 2A:
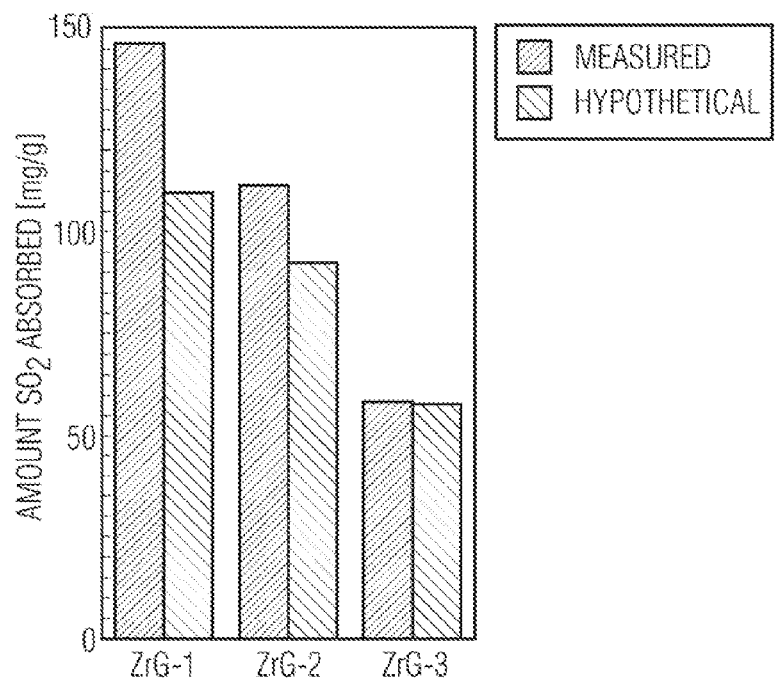
FIG. 2A a comparison of measured and hypothetical sulfur dioxide adsorption capacities of samples of the present compositions in dry (A) condition in accordance with the present invention.
Figure 2B:
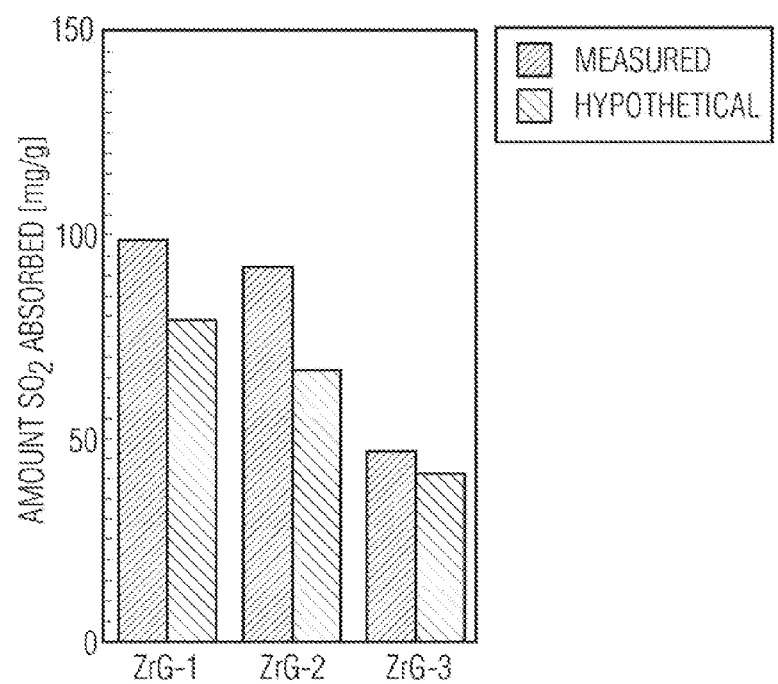
FIG. 2B shows a comparison of measured and hypothetical sulfur dioxide adsorption capacities of samples of the present compositions in moist (B) condition in accordance with the present invention.

For further evaluation of the adsorption process, the capacities per gram of adsorbents were analyzed. To visualize the synergetic effect of the composition formation, the measured capacities were compared to those hypothetical ones calculated assuming the physical mixture of the components and their capacities. The results obtained are presented in FIGS. 2A (dry conditions) and 2B (moist conditions). The effect of the enhancement is observed especially for ZrG-1 and ZrG-2. It is interesting that while for the former sample the adsorption in dry conditions seems to benefit from the composition formation as shown in FIG. 2A, for the latter sample the enhancing effect is more visible when the moisture is present in the system as shown in FIG. 2B. For ZrG-2 there is a very small difference between the capacity measured in dry and moist conditions. The sample with the high content of GO exhibits only the capacity of the ZrA component with no visible synergetic effect. It is interesting that the amount of water adsorbed is not affected by the composition of the materials. This can be caused by the high affinity of GO present to retain water. Slightly less water adsorbed in the case of ZrG-2 can be related to the chemistry of composition formation, which is discussed below.

Figure 3:
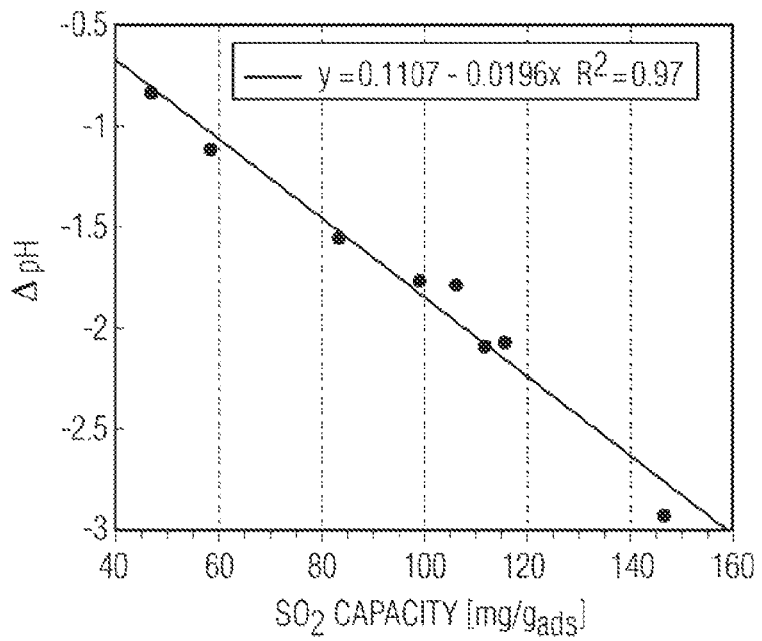
FIG. 3 shows a correlation in the adsorption capacity of sulfur dioxide with the change in pH after adsorption by samples of the present compositions in accordance with the present invention.

Interesting behavior is observed in the trend of the surface pH values, which represent the average acidity of the synthesized materials. While $Zr(OH)_4$ can be considered as chemically neutral, building a composition with a much more acidic component, GO, results in an unexpected increase in samples' basicity. This is a direct indication of the new chemistry formed in this process. Since the basic character of the adsorbents was observed to be important for $SO_2$ adsorption, this factor has to be considered in derivation of the adsorption mechanism. After $SO_2$ adsorption, pH becomes much more acidic. We link this result to the chemical reaction and formation of acids and salts. FIG. 3 shows the direct relationship between the decrease in the samples' pH and the amount of $SO_2$ adsorbed. This linear trend suggests relatively simple chemistry of reactive adsorption.

Based on the results of the XPS study, it is expected that zirconium sulfite, $Zr(SO_3)_2$ is a major reaction product on hydrous zirconia. It is believed that only about 10% of hydroxyl groups were involved in surface reactions, assuming that all $SO_2$ reacted with $Zr(OH)_4$. In the case of the present materials it is believed that "utilization" of surface chemistry in dry conditions would be 14%, 18%, 14% and 7% for ZrA, ZrG-1, ZrG-2 and ZrG-3, respectively. In wet conditions those number are 10%, 12% 13% and 6% for ZrA, ZrG-1, ZrG-2 and ZrG-3, respectively. In the case of the present compositions, that increase in the surface efficiency can be caused by synergetic effects of both, chemistry and porosity of the new materials. It is interesting to note that even for pure hydrous zirconia the efficiency of the stoichiometric reaction is higher than that for the commercial material.

Figure 4:
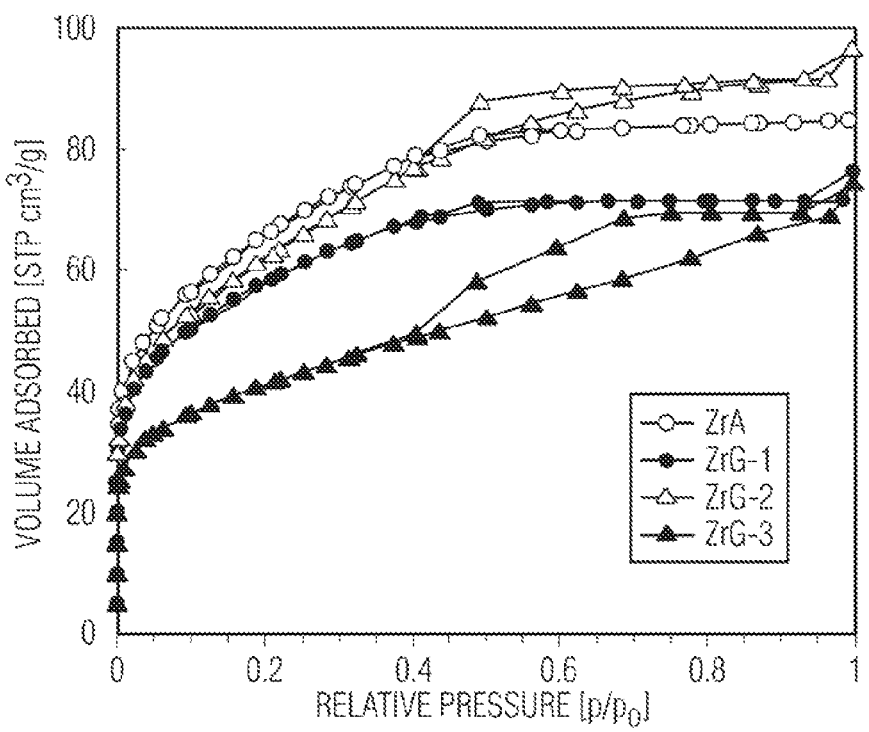
FIG. 4 shows nitrogen adsorption isotherms of samples of the present compositions in accordance with the present invention.

To propose feasible mechanisms of the composition formation and $SO_2$ reactive adsorption the porosity of the materials studied has to be analyzed. The measured nitrogen adsorption isotherms are collected in FIG. 4. Their shapes indicate the presence of micropores and mesopores. The volume of latter increases with an increase in the content of GO as evidenced by the shape of the hysteresis loop. The parameters of the porous structure calculated from the nitrogen adsorption isotherms for the initial and exhausted adsorbents are summarized in Table 2 as follows.

TABLE 2

| Sample | $S_{BET}$ [m²/g] | $V_t$ [cm³/g] | $V_{meso}$ [cm³/g] | $V_{mic}$ [cm³/g] | $V_{mic}/V_t$ |
|---|---|---|---|---|---|
| ZrA | 230 | 0.131 | 0.071 | 0.060 | 0.46 |
| ZrA-ED | 256 | 0.151 | 0.086 | 0.065 | 0.43 |
| ZrA-EM | 230 | 0.134 | 0.077 | 0.057 | 0.43 |
| ZrG-1 | 201 | 0.119 | 0.067 | 0.052 | 0.44 |
| ZrG-1-ED | 222 | 0.126 | 0.070 | 0.056 | 0.44 |
| ZrG-1-EM | 220 | 0.126 | 0.067 | 0.059 | 0.47 |
| ZrG-2 | 219 | 0.150 | 0.099 | 0.051 | 0.34 |
| ZrG-2-ED | 206 | 0.126 | 0.076 | 0.050 | 0.40 |
| ZrG-2-EM | 202 | 0.123 | 0.072 | 0.051 | 0.42 |
| ZrG-3 | 141 | 0.115 | 0.079 | 0.036 | 0.31 |
| ZrG-3-ED | 154 | 0.128 | 0.096 | 0.032 | 0.25 |
| ZrG-3-EM | 160 | 0.129 | 0.090 | 0.039 | 0.30 |

Figure 5A:
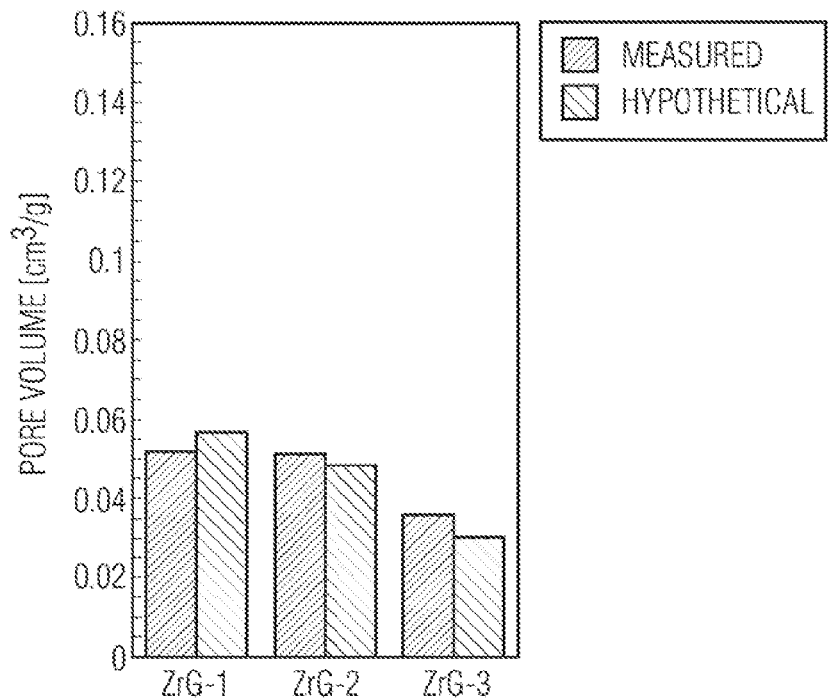
FIG. 5A shows a comparison of measured and hypothetical micropore volumes of samples of the present compositions in accordance with the present invention.
Figure 5B:
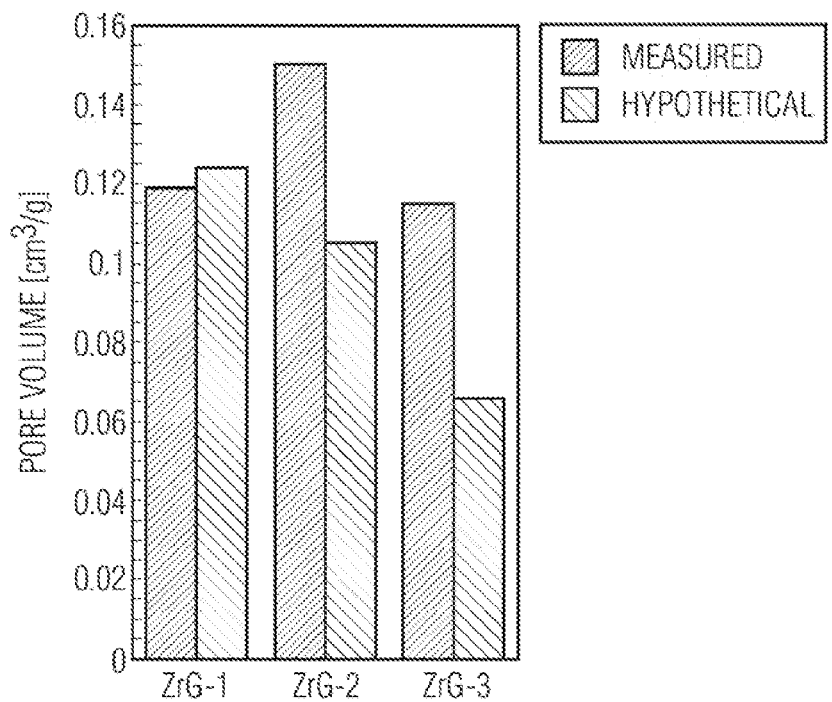
FIG. 5B shows a comparison of measured and hypothetical total pore volume of samples of the present compositions in accordance with the present invention.

The surface area and pore volume of ZrA consist of only about 60% of the values reported for the commercial material. Nevertheless, as indicated above, the capacity for $SO_2$ removal is higher. All materials studied but GO can be considered as mesoporous. GO, as discussed previously, does not exhibit any porosity seen by nitrogen molecules. A synergetic effect of the composition formation is seen when the measured porosity is compared to that hypothetical one calculated assuming the physical mixture of the components as shown in FIGS. 5A and 5B. The most visible changes are those for ZrG-2 and ZrG-3. While larger pores can be formed between the GO flakes and the $Zr(OH)_4$ units, the origin of an increased microporosity is expected to be in the new chemistry formed between the components of the composition.

After exposure to $SO_2$ no significant changes in the porosity are noticed. This indicates that even though the chemical reaction could take place, the lattice of the materials' structure is preserved, which is rather expected taking into account low stoichiometrical reactivity of surface hydroxyls. That reactivity can be limited to the terminal —OH in the predominantly mesoporous structure of the final materials, owing to their accessibility. If any $SO_2$ was physically adsorbed in small pores it could be removed during outgassing at 120° C. That outgassing could also remove $SO_2$ chemically bound if the decomposition temperature of the products of surface reactions was close to that one used during outgassing.

Figure 6:
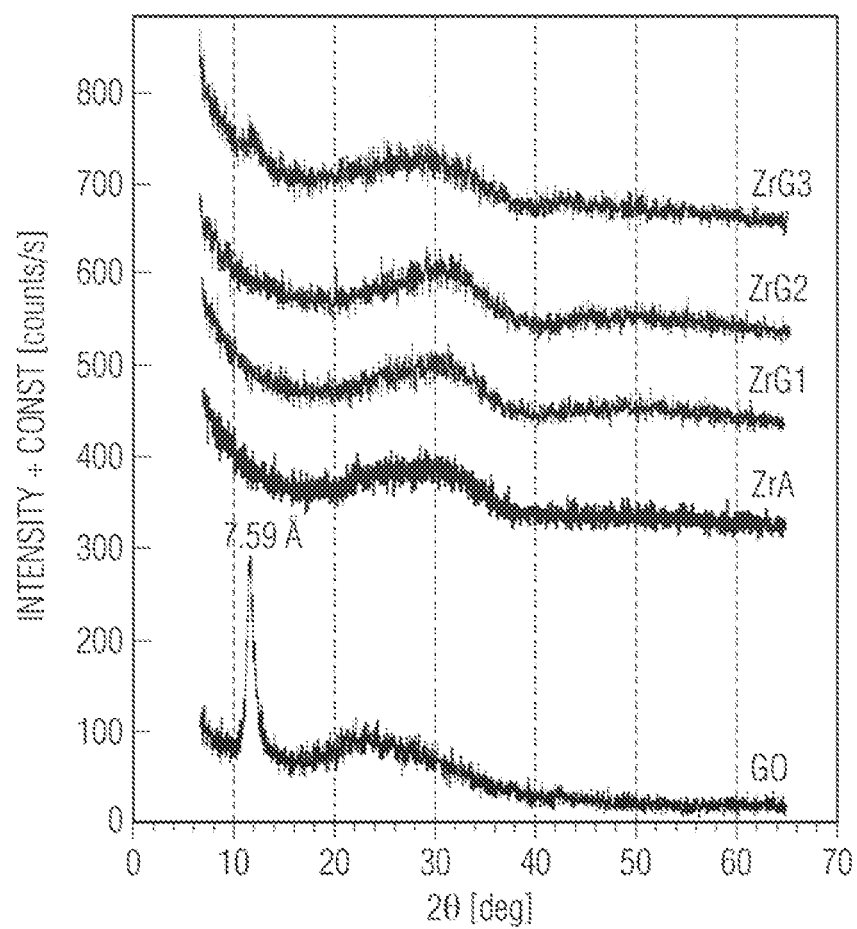
FIG. 6 shows XRD data of samples of the present compositions in accordance with the present invention.
Figure 7A:
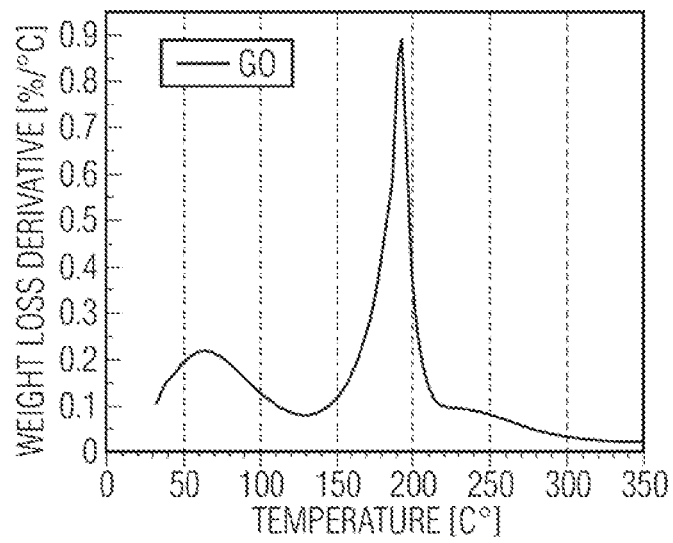
FIGS. 7A to 7E show DTG curves in nitrogen for initial and exhausted samples of the present compositions in accordance with the present invention.
Figure 7B:
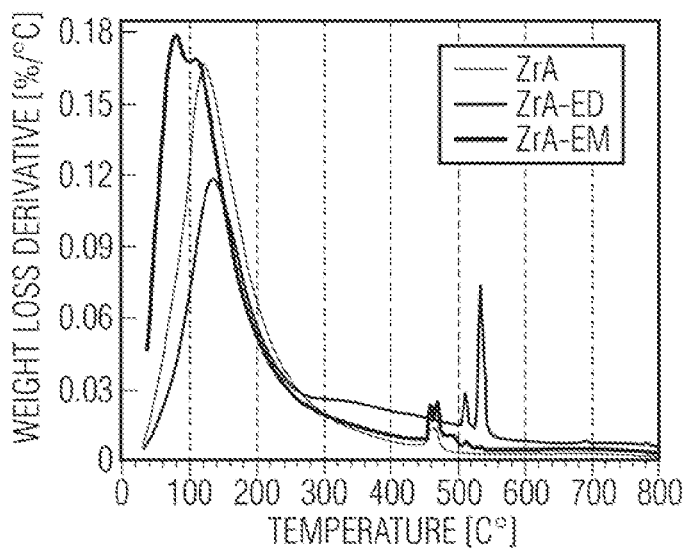
Figure 7C:
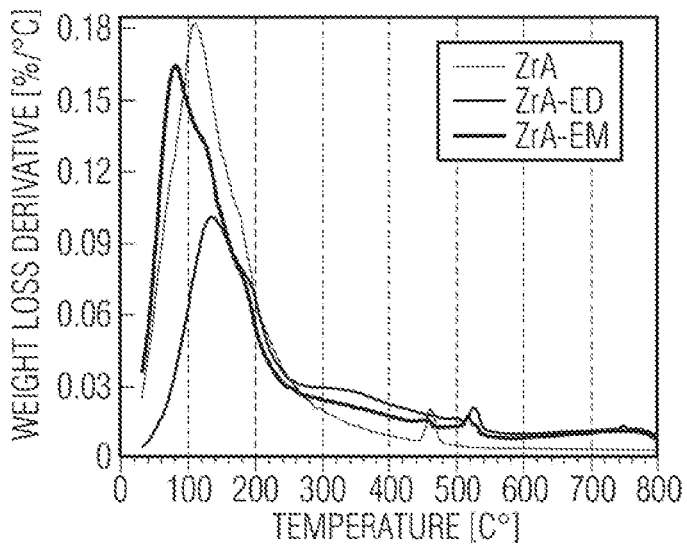
Figure 7D:
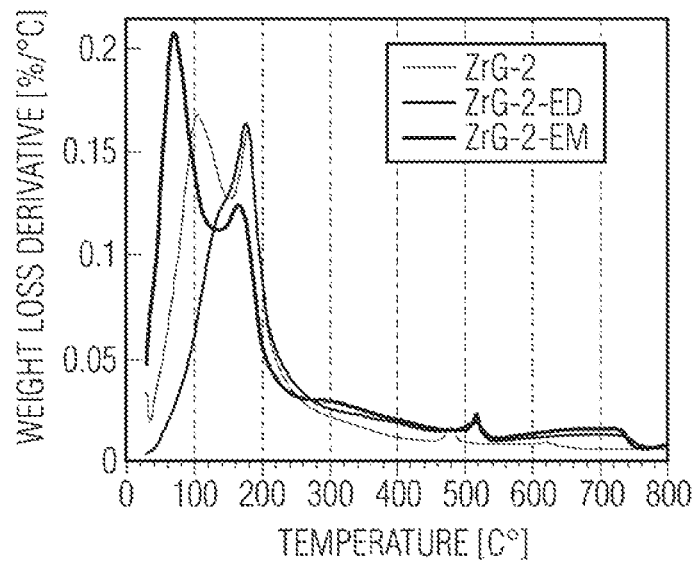
Figure 7E:
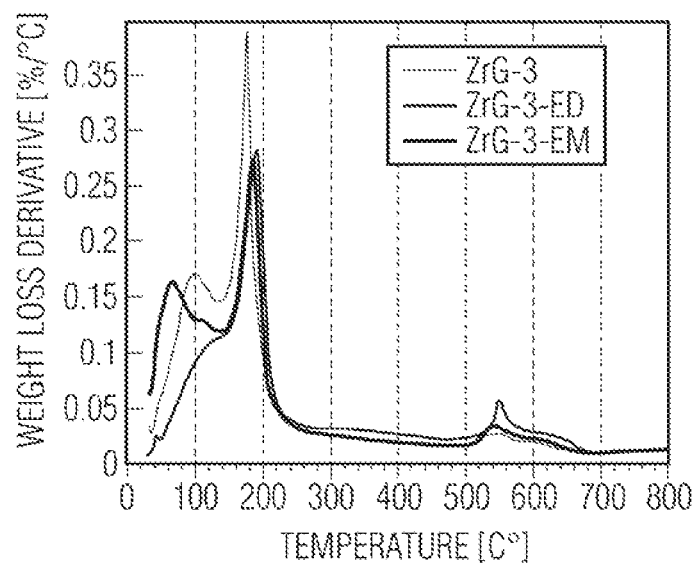

The X-ray diffraction patterns of graphite oxide, hydrous zirconia and its compositions are shown in FIG. 6. For GO, the peak at $2\Theta\square11.7°$ corresponds the interlayer distance of 7.59 Å. Since hydrous zirconia represents the major component of the composition in graphite oxide, XRD pattern of amorphous hydrous zirconia was expected. For the composition the diffraction peak of GO is not seen and only a small shoulder is visible with an increase in the content of graphite oxide.

Thermal analysis of the materials before and after $SO_2$ adsorption can throw some lights on the products of surface reactions. The differential thermal gravimetric (DTG) curves are presented in FIGS. 7A-7E. For the ZrA sample a gradual weight loss is assigned to the dehydration and dehydroxylation of a complex structure of zirconium hydroxide. In the case of the present composition, further weight loss occurs at about 200° C. It is seen as a shoulder for ZrG-1 and a well-defined peak for ZrG-3 and they represent the decomposition of the epoxy groups of the GO component (see FIGS. 7A-7E). For the unexposed samples a sharp peak at about 460° C. of decreasing intensity with an increase in the content of GO represents formation of metastable tetragonal zirconium oxide.

After exposure of ZrA to $SO_2$ in dry conditions a gradual weight loss is revealed between 220° C. and 450° C. It is likely related to the removal of water formed in the reaction of $SO_2$ with OH groups and to the decomposition of $Zr(SO_3)_2$. The weight loss between 200° C.-500° C. associated with adsorbed $SO_2$ was also observed for commercial $Zr(OH)_4$. A phase transformation to zirconium oxide in ZrA-ED is represented by two sharp peaks at about 500° C. This complexity is linked to the more complex chemistry of the exhausted adsorbent than that of the initial sample. Interestingly, when the experiments were run in moist air the similar pattern to that one for unexposed zirconium hydroxide was observed. The only visible difference is at low-temperature peaks (~100° C.) which we linked to the removal of physically adsorbed $SO_2$ and water with dissolved $SO_2$ ($H_2SO_3$). For the compositions with 5 wt % and 20 wt % of GO, either run in dry or wet conditions, a gradual weight loss between 250° C. and 500° C. is observed with visible sharp peaks of the phase transformation at 520° C. Moreover, a well-marked weight loss was also observed between 550° C. and 800° C. It is linked to the decomposition of zirconium sulfate, $Zr(SO_4)_2$ with the emission of $SO_3$.

Formation of those species in the presence of the GO component can be explained by the oxidative capability of the carbonaceous material with incorporated oxygen functional groups. Moreover, since the GO used in the synthesis was obtained by the Hummers method, sulfonic groups present on the surface can also react with zirconium during the preparation step. This can be seen on the DTG curves about 600° C. for the ZrG-2 and ZrG-3. The sharp peaks at temperatures less than 150° C. are assigned to the removal of physically adsorbed water and $SO_2$ dissolved in a water film. Nevertheless, knowing that the solubility of $SO_2$ in water at 25° C. is 9.6 mg/100 ml and assuming that all pores are filled by water, only a small fraction of $SO_2$ can exist in the latter form. That low temperature weight loss is especially well pronounced for ZrG-2, for which the adsorption at moist conditions was high and close to that one in the absence of water.

Results of analysis of weight for the exhausted samples and the expected and measured contents of sulfur after the breakthrough experiments are presented in Table 3 as follows.

TABLE 3

| Sample | Δ [%] 210-400° C. | Δ [%] 400-700° C. | ΣΔ [%] | $S_{SO2}$ [%] | $S_{XRF}$ [%] | $S_{SO2}/S_{XRF}$ |
|---|---|---|---|---|---|---|
| ZrA-ED | 1.0 | 3.06 | 4.06 | 5.77 | 4.4 | 1.31 |
| ZrG-1-ED | 1.46 | 2.54 | 4.00 | 7.32 | 4.6 | 1.59 |
| ZrG-2-ED | 0.93 | 1.43 | 2.36 | 5.58 | 4.1 | 1.36 |
| ZrG-3-ED | 0.93 | 2.12 | 3.05 | 2.93 | 2.5 | 1.17 |
| ZrA-E M | 0 | 0.94 | 0.94 | 4.16 | 4.2 | 0.99 |
| ZrG-1-EM | 0.49 | 1.79 | 2.28 | 4.96 | 3.6 | 1.37 |
| ZrG-2-EM | 0.73 | 1.86 | 2.59 | 5.30 | 3.5 | 1.51 |
| ZrG-3-EM | 0 | 0.55 | 0.55 | 2.34 | 2.4 | 0.97 |

The percentage of the weight loss between 210° C. and 700° C. shown in Table 3 is linked to the strong reactive adsorption. Only the difference between the weight of the exhausted and the initial samples are listed in this table along with the comparison of the amount of $SO_2$ adsorbed and sulfur detected in the materials using XRF. Assuming that the weight loss between 200° C.-700° C. represents the removal of sulfur oxide reacting with terminal OH groups, the amounts of sulfur coming to the system and that detected are far away from being balanced (it is assumed that sulfur from sulfonic groups does not contribute significantly to the material balance).

The differences are greater for the experiments run in dry conditions than for those in moist conditions. This supports our hypothesis that the significant amount of sulfur is physically adsorbed in small pores and removed at temperature less than 200° C. This could also explain the unchanged porosity after the breakthrough experiments. That contribution of physically adsorbed sulfur dioxide seems to be especially high for ZrG-1 and ZrG-2. For these two samples the synergetic effect of the enhancement in the $SO_2$ removal capacity is high (see FIGS. 2A and 2B). Interestingly, the synergy in porosity was not important for ZrG-1. This suggests that the enhancement in the capacity of ZrG-1 is mainly caused by chemical factors, whereas for ZrG-2 the porosity effect is predominant. This is supported by the dramatic change in the shape of nitrogen adsorption isotherm between ZrG-1 and ZrG-2. In the latter the hysteresis loop is clearly visible.

Figures 8A, 8B:
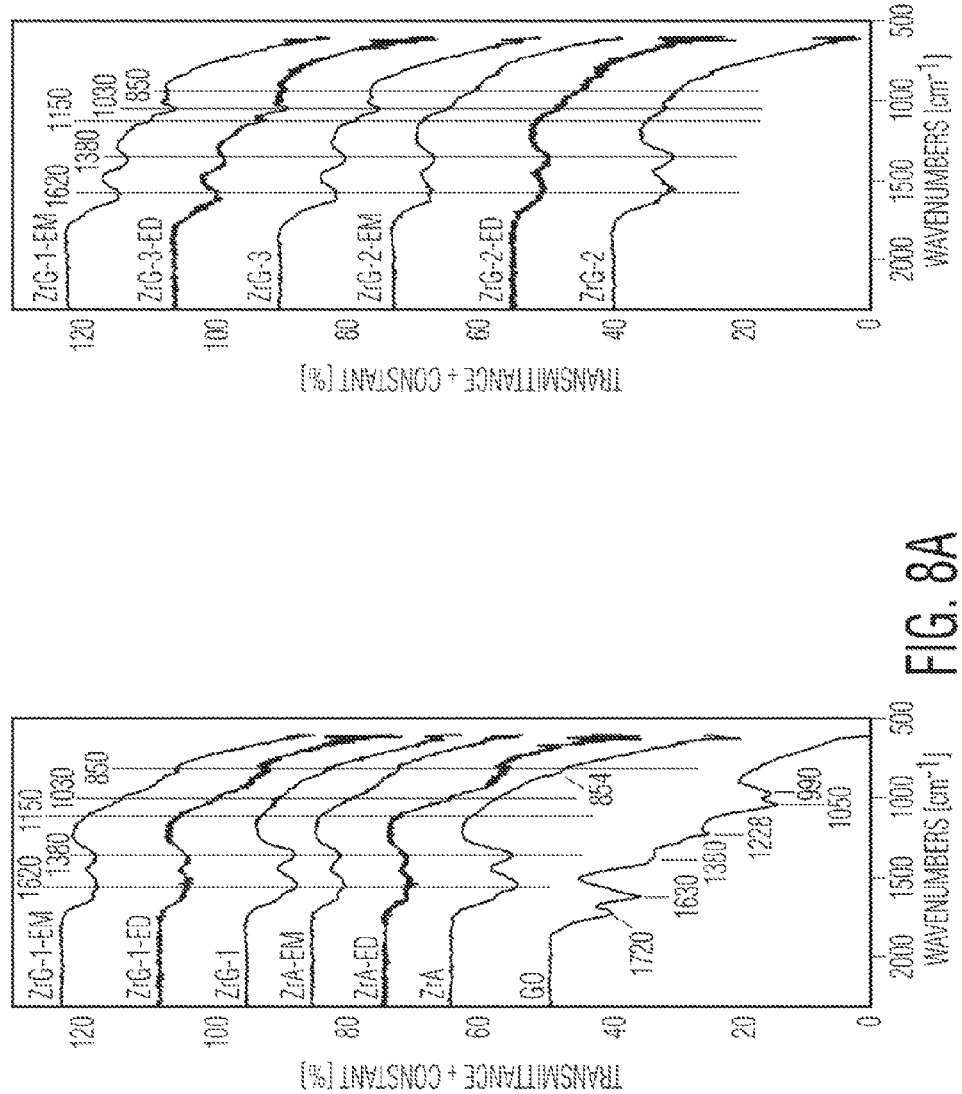
FIGS. 8A and 8B show FTIR spectra of samples of the present composition in accordance with the present invention.

In reference to FIGS. 8A and 8B, the FTIR spectra are analyzed to investigate the aspects of changes in surface chemistry. Vibrations characteristic for graphite oxides appear at 1050 cm$^{-1}$, 1380 cm$^{-1}$ and 1630 cm$^{-1}$. They correspond to the stretching of C—O bonds from carboxylic groups, to O—H bending from hydroxyl/phenol groups and to either O—H vibration in water and/or to the presence of oxygen surface compounds (cyclic ethers), respectively. The band at 1735 cm$^{-1}$ is characteristic of C═O stretching vibration in carboxylic acids. Vibrations at 990 cm$^{-1}$ correspond to epoxy/peroxide groups. A band at 1228 cm$^{-1}$ on the GO spectra might be related to S═O asymmetric stretching vibration in sulfonic groups and/or vibration of C—O in epoxides. It has to be noted that the symmetric vibration of S═O from sulfonic groups appears at 1050 cm$^{-1}$ as for the vibration of C—O. The absorption peaks at 1620 cm$^{-1}$ and 1380 cm$^{-1}$ for zirconium hydroxide are assigned to OH groups of water and O—H bending vibration from Zr—OH. The band at 854 cm$^{-1}$ is attributed to Zr—O lattice vibration. For compositions with low content of GO (5 wt % and 20 wt %) the vibrations of oxygen groups such as epoxide and carboxylic are not visible. When the content of GO reaches 50 wt % these bands appear but they are of lower intensity than those for pure GO. On the other hand, the band at 854 cm$^{-1}$ representing Zr—O lattice is seen for ZrG-1 and ZrG-2.

After $SO_2$ adsorption the spectra for ZrA, ZrG-1 and ZrG-2 visibly change in the range between 850 and 1200 cm$^{-1}$. Moreover, the bands at 1380 cm$^{-1}$ and 1620 cm$^{-1}$ are much less pronounced suggesting replacement of some —OH groups as a result of their reactions with sulfur oxide. This is especially seen on the spectra of samples on which the highest amounts of $SO_2$ were adsorbed. The absorption bands between 850 and 1200 cm$^{-1}$ are linked to the vibrations from sulfur oxygen bonds. $SO_4^{2-}$ ions are represented by the bands at 1150 cm$^{-1}$, and $HSO_4^-$ by the bands at 850 cm$^{-1}$ and 1030 cm$^{-1}$. At 1150 cm$^{-1}$ there is also a possibility of vibrations from $SO_3^{2-}$. This is especially seen for the compositions with the lowest content of GO.

In the case of this material it was hypothesized that the enhancement in the amount adsorbed was mainly owing to the new chemistry formed as a result of the synergy between the composition components. That chemistry was demonstrated by the increase in the pH values listed in Table 1. Sulfate bands are likely the result of $SO_2$ oxidation by either oxygen dissolved in water or superoxide anions $O_2^-$ activated by GO layers. The presence of sulfates was suggested by DTG curves for the exhausted compositions.

Figure 9A:
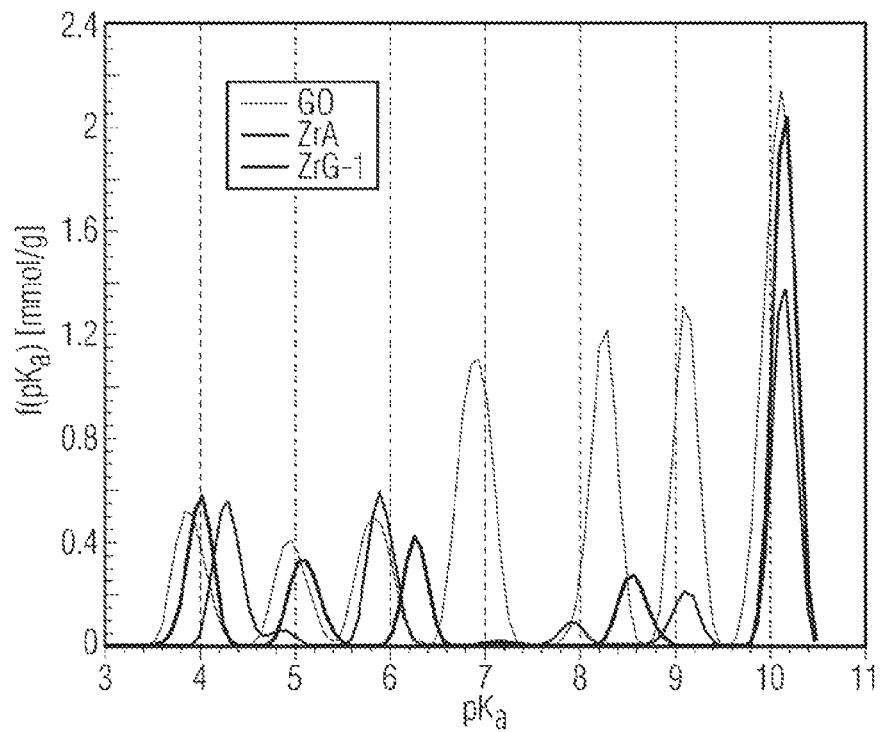
FIGS. 9A and 9B show distributions of acidity constants for species present on the surface of initial samples of the present compositions in accordance with the present invention.
Figure 9B:
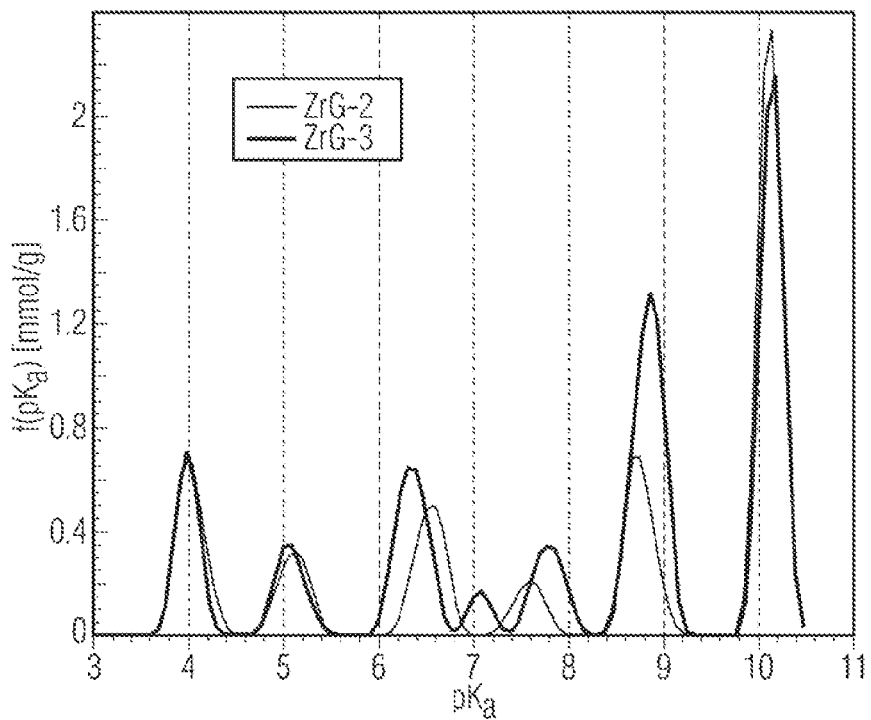
Figure 10A:
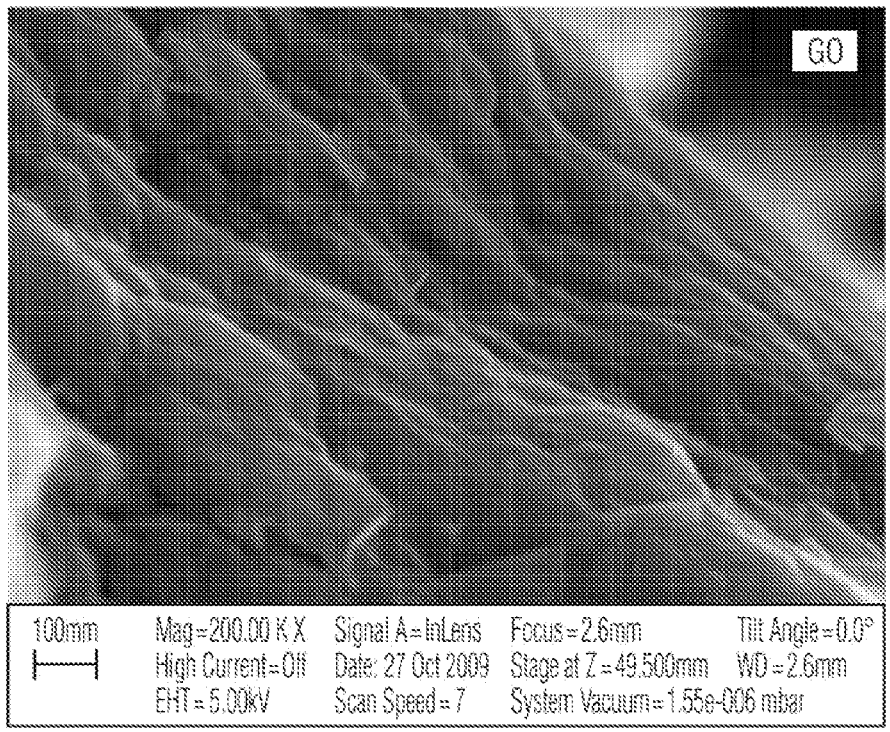
FIGS. 10A to 10D show SEM micrographs for selected samples of the present compositions in accordance with the present invention.
Figure 10B:
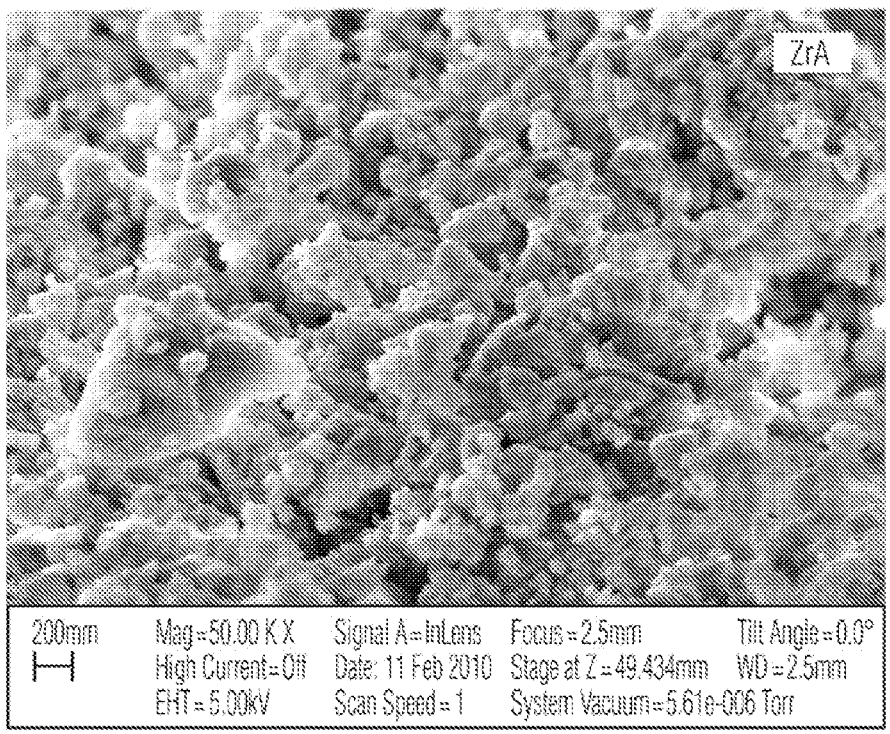
Figure 10C:
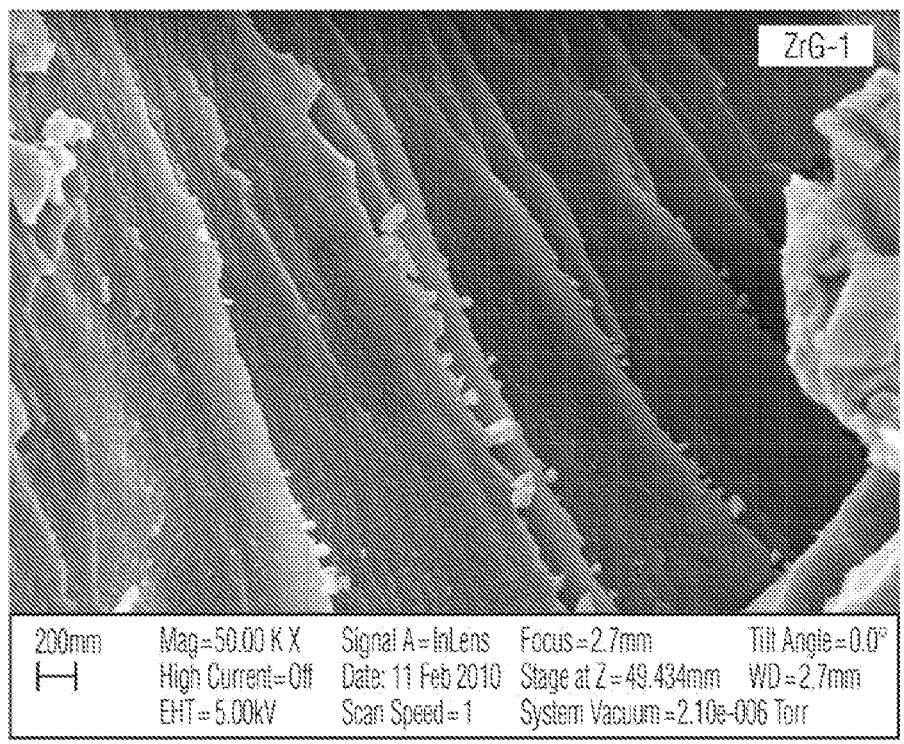
Figure 10D:
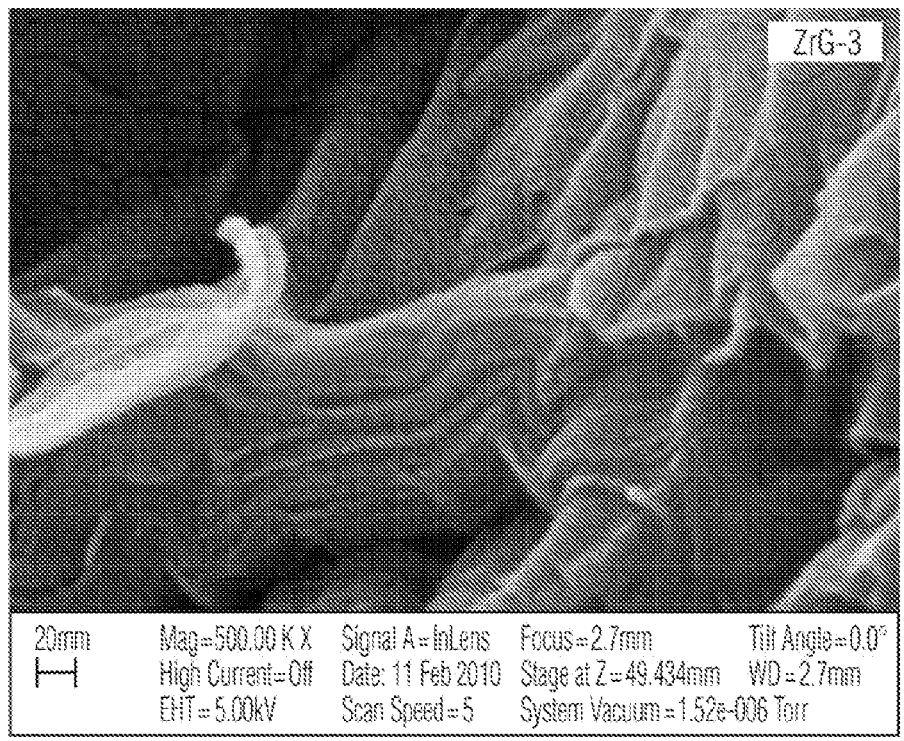

In reference to FIGS. 9A and 9B, the new chemistry of the compositions is also observed in the $pK_a$ distributions for the initial samples. On the surface of GO carboxylic ($pK_a$<7) and —OH groups (pH>7) are seen. On the other hand, the peaks at $pK_a$ about 4.0, 6.5, 7.8, 9.0 for zirconium hydroxide represent various Brønsted acidic groups of Zr—OH. Formation of the composition, even with 5 wt % of GO, results in the appearance of groups with $pK_a$ of about 5, 6.5 and 8.5, whose amounts cannot be linked proportionally to the content of GO. Also a significant quantity of new groups at $pK_a$ about 10 is revealed. They might be responsible for the predominant basicity of the compositions. The significance of the groups detected at the end of the experimental window should not be over interpreted owing to the assumptions used in the calculations.

As indicated in the literature, zirconium hydroxide is envisioned as two-dimensional square lattice, which is connected with each other by bridging hydroxyl groups. GO on the other hand consists of graphene layers with epoxy and —OH groups attached to the basal planes and carboxylic and sulfonic groups existing at the edges of these layers. Those —OH groups of graphene layers dispersed in water can work as a bridging groups resulting in chemical bonds between the two components of the mixture. Another possible mechanism of interactions is hydrogen bonding between the units of hydrous zirconia and the epoxy groups of GO. Mesopores are likely formed as a result of the reactions of zirconium with carboxylic and sulfonic groups of graphene layers, which can lead to the house-of-card structure. They can be also formed between the new units. The change in the zirconium environment was demonstrated by new peaks on the $pK_a$ distributions. A small amount of GO in the case of ZrG-1 can explain a lack of synergetic effect on the porosity (see FIGS. 5A and 5B).

Greater amounts GO promotes greater involvement of —OH groups as bridging groups interacting with zirconium hydroxide components and thus the synergetic effect on the porosity is greater. The lower volume of pores in ZrG-3 compared to other compositions results in the reduced $SO_2$ removal capacity. Also the fact that more zirconium is involved in the reactions with the acidic groups of GO causes that the edges of the zirconium oxide phase cannot be active in the reactions of sulfate formation. It is hypothesized that terminal —OH is taking part in the surface reactions. This negatively compensates the synergetic effect caused by the porosity development.

Conversely, the large enhancement in the $SO_2$ removal capacity, especially in dry conditions is caused by the increased basicity of the composition. Even though bridging zirconium units with some —OH groups of distorted graphene layers eliminates certain oxygen containing centers of both, GO and $Zr(OH)_4$. The new centers remain polar/basic in nature and thus $SO_2$ can be adsorbed owing to its polarity. When water is present in the system it competes with $SO_2$ for those specific centers, fills up the small pores and $SO_2$ can be adsorbed there only by dissolution. The similarity in the amounts of $SO_2$ adsorbed on ZrG-2 in dry and wet conditions can be linked to more pore space between the graphene and zirconium hydroxides layers compared to that for ZrG-1. The surface in those pores, owing to the nature of graphene, is more hydrophobic than that of hydrous zirconia. Therefore $SO_2$ is attracted to those pores stronger than water owing to the differences in their polarity (dipole moment of $SO_2$ is 1.61 D compared to 1.87 D for water).

In reference to FIGS. 10A to 10D, the texture of the samples is presented on SEM micrographs. As seen, $Zr(OH)_4$ component deposits on the layers of GO. The thin composite layers arranged in agglomerates are especially seen for ZrG-3 owing to the high content of GO and reactions of zirconium hydroxide with surface OH groups. When the content of GO is very small the GO layers in parallel positions are still seen but between them the large units of hydrous zirconia are present. This process of composition formation is visualized in FIGS. 10C and 10D where zirconium hydroxide units are linked to GO layers via reactions with surface oxygen groups.

Conclusions:

The results presented herein demonstrate the synthesis of hydrous zirconia/graphene compositions. As a result of the chemical synergy, new pores and new surface chemistry are formed. These effects resulted in the enhancement in sulfur dioxide removal capacity in both dry and moist conditions. The addition of a graphene component makes the surface less competitive towards adsorption of water. It is hypothesized that the compositions are formed via involvement of OH groups of graphene layers in bridging with $Zr(OH)_4$ lattice and via reactions of zirconium with acidic groups present on the edges of graphene layers. $SO_2$ is retained on the surface via physical adsorption in small pores and via reactions with terminal —OH groups of hydrous zirconia. The latter reaction leads to the formation of sulfides. There is an indication that the small amount of sulfates is also formed owing to the oxidation of $SO_2$ by oxygen activated by the specific chemistry of graphene layers.

Example 3

Adsorption of $H_2S$ Using Graphite Oxide/$Zr(OH)_4$ Composition

Experimental

Materials:

The materials prepared in Example 1 were studied as adsorbents for hydrogen sulfide in the dynamic tests described below under dry (D) and wet conditions (M). After the concentration of $H_2S$ in the effluent gas reached 100 ppm the samples were considered as exhausted for hydrogen sulfide adsorption. Such samples are identified with letter "E" added to their names.

Methods:

$H_2S$ Breakthrough Capacity

Dynamic tests were carried out at room temperature to evaluate the capacity of the adsorbents for $H_2S$ removal from moist air. Adsorbent samples were packed into a glass column (internal diameter 9 mm). A bed volume used was 1.2 cm$^3$ (with the mass of adsorbent between 1.27 to 1.45 g). Before the experiments in moist air the samples were prehumidified with moist air (relative humidity 70% at 25° C.) for two hours. The amount of water adsorbed was estimated from the increase in the sample weight. Humid air containing 0.1% (1,000 ppm) $H_2S$ was then passed through the column of adsorbent at 500 mL/min. The breakthrough of $H_2S$ was monitored using a MultiRae Plus monitoring system with an electrochemical sensor. The test was stopped at the breakthrough concentration of 100 ppm (sensor limit).

The adsorption capacities of each adsorbent in terms of g of $H_2S$ per g of carbon were calculated by integration of the area above the breakthrough curves, and from the $H_2S$ concentration in the inlet gas, flow rate, breakthrough time, and mass of adsorbent. For each sample the $H_2S$ test was repeated at least twice. The determined capacities agreed to within 4%. To check the oxidation capabilities, the concentrations of $SO_2$ in effluent air were also measured. The presence of weakly adsorbed $H_2S/SO_2$ was monitored during purging the adsorbent column with air at 470 mL/min immediately after the breakthrough experiment.

Nitrogen Adsorption

Nitrogen adsorption isotherms were measured using an ASAP 2010 analyzer commercially available from Micromeritics of Norcross, Ga., at −196° C. Before the experiment, the samples were degassed at 120° C. to a constant pressure of 10$^{-4}$ Torr. The isotherms were used to calculate the specific surface area, $S_{BET}$, micropore volume, $V_{mic}$, total pore volume, $V_t$, and pore size distribution. The micropore volume was calculated using Dubinin-Radushkevich approach and the total pore volume seen by the nitrogen molecules, from the last point of the isotherms based on the volume of nitrogen adsorbed. The volume of mesopores, $V_{mes}$, represents the different between those two values. The relative microporosity was calculated as the ratio of the micropore volume to the total pore volume.

pH of the Surface

A 0.1 g sample of dry adsorbent was added to 5 mL of deionized water and the suspension stirred overnight to reach equilibrium. The sample was filtered and the pH of solution was measured using an Accumet Basic pH meter.

Thermal Analysis

Thermal analysis was carried out using TA Instruments Thermal Analyzer. The heating rate was 10° C./min in a nitrogen atmosphere at 100 mL/min flow rate. The samples were heated up to 1000° C.

Elemental Analysis

The content of sulfur was evaluated using X-ray fluorescence (SPECTRO model 300T Benchtop Analyzer) based on the calibration curve done for the samples with the internal standard of sulfur. The instrument has a titanium target X-ray tube and a high-resolution detector.

Fourier Transform Infrared Spectroscopy (FTIR)

FTIR spectroscopy was carried out using a Nicolet Magna-IR 830 spectrometer using the attenuated total reflectance (ATR) method. The spectrum was generated and collected 16 times and corrected for the background noise. The experiments were done on the powdered samples, without KBr addition.

Potentiometric Titration

Potentiometric titration measurements were performed with a DMS Titrino 716 automatic titrator (Metrohm). The instrument was set at the mode where the equilibrium pH is collected. Subsamples of the initial and exhausted materials (0.100 g) were added to $NaNO_3$ (0.01 M, 50 mL) and placed in a container maintained at 25° C. overnight for equilibrium. During the titration, to eliminate the influence of atmospheric $CO_2$, the suspension was continuously saturated with $N_2$. The suspension was stirred throughout the measurements. Volumetric standard NaOH (0.1 M) was used as the titrant. The experiments were done in the pH range of 3-10. Each sample was titrated with base after acidifying the sample suspension. No sharp changes in the slope were noticed which indicates the stability of the material in the experimental pH window.

The experimental data was transformed into a proton binding isotherm, Q, representing the total amount of protonated sites, which is related to the $pK_a$ distribution by the following integral equation:

$$Q(\text{pH}) = \int_{-\infty}^{\infty} q(\text{pH}, pK_a) f(pK_a) d\, pK_a \qquad (1)$$

The solution of this equation is obtained using the numerical procedure, which applies regularization combined with non-negativity constraints. Based on the spectrum of acidity constants and the history of the samples, the detailed surface chemistry was evaluated.

Figure 11A:
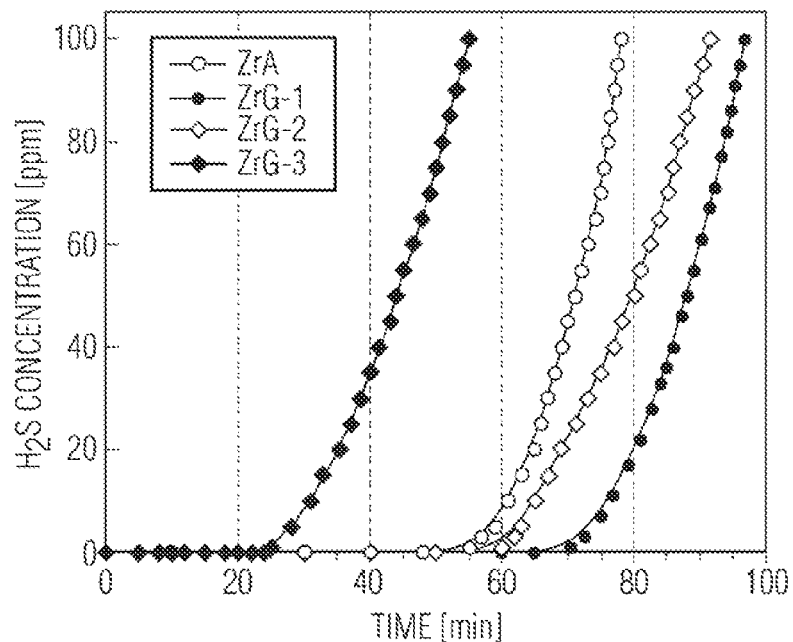
FIGS. 11A and 11B show breakthrough and desorption curves for hydrogen sulfide and concentration curves for sulfur dioxide, respectively, obtained on samples of the present compositions in accordance with the present invention.
Figure 11B:
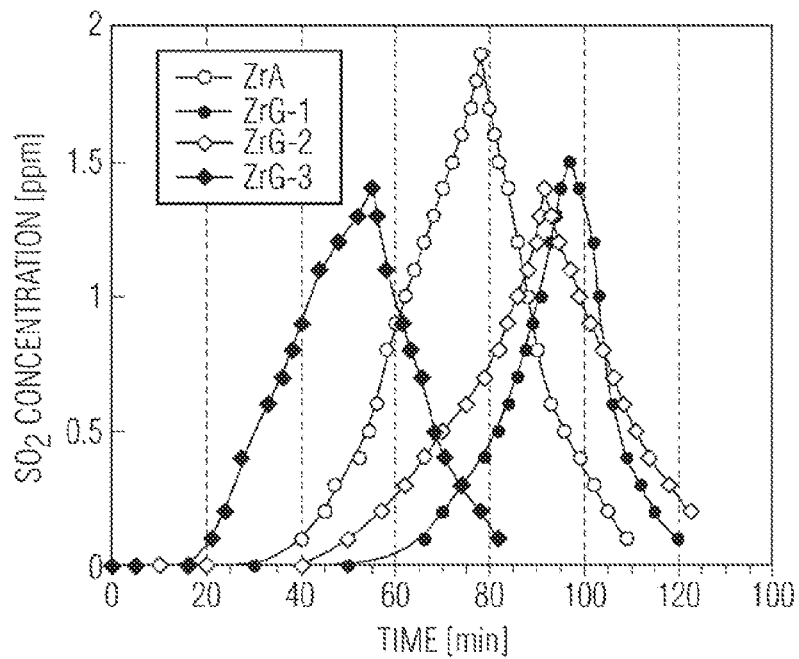

Results and Discussions:

The $H_2S$ breakthrough curves obtained on the sample adsorbents are shown in FIG. 11A. The results for GO are not included since the material does not adsorb any hydrogen sulfide. Compared to ZrA, an improvement in the breakthrough time is observed. In all cases no $H_2S$ was measured after disconnection of the challenge gas and purging with air, which indicates a very strong adsorption. The $SO_2$ concentration curves obtained on the sample adsorbents are shown in FIG. 11B.

Conversely, from the surface of all materials small quantities of $SO_2$ were released which points out that the surface mediated oxidation of sulfur from $S^{-2}$ to $S^{+4}$ took place. In all cases $SO_2$ was released before observation of the breakthrough of $H_2S$. This suggests that the surface sites are more favorable for the hydrogen sulfide retention than for that of $SO_2$. The analysis of the breakthrough time for $SO_2$ and the steepness of the desorption curves indicates that ZrG-1 is the adsorbent on which the $SO_2$ is formed and released from the surface in the smallest relative quantity. This, and the fact that the breakthrough time for $H_2S$ is the longest suggest that ZrG-1 is the most efficient adsorbent. Interestingly, on the surface of ZrA the highest concentration of the released $SO_2$ is measured.

The calculated breakthrough capacities, amounts of water preadsorbed, and surface pH values before and after $H_2S$ adsorption are listed in Table 4 as follows.

TABLE 4

| Sample | $H_2S$ Breakthrough capacity | | $H_2O$ adsorbed | pH | |
|---|---|---|---|---|---|
| | [mg/g] | [mg/cm³] | [mg/g] | In | Exh |
| ZrA | 41.3 | 49.7 | 87.2 | 7.04 | 6.94 |
| ZrG-1 | 52.8 | 61.6 | 85.0 | 6.96 | 6.82 |
| ZrG-2 | 48.1 | 57.9 | 72.3 | 5.83 | 5.85 |
| ZrG-3 | 33.2 | 34.6 | 46.0 | 5.26 | 5.22 |

Figure 12:
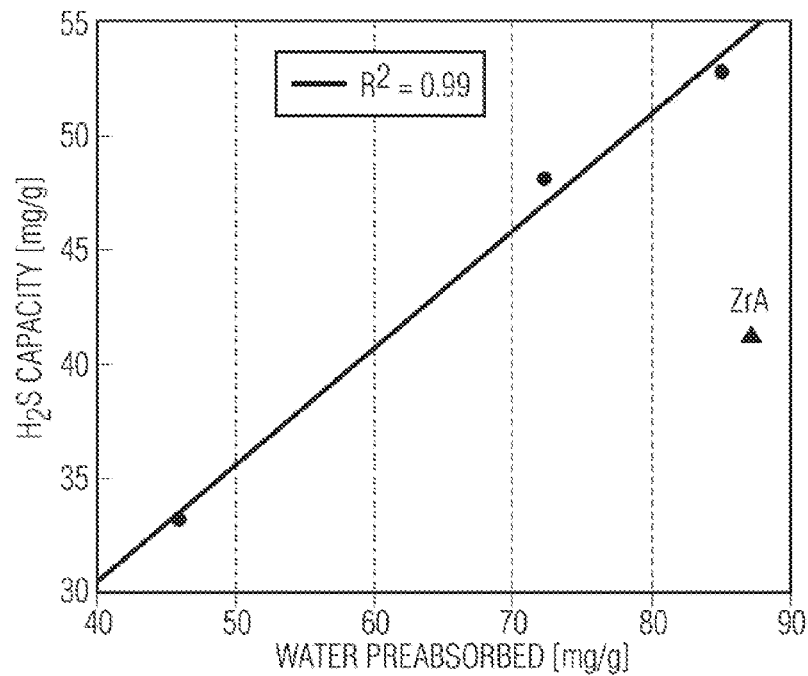
FIG. 12 shows a relationship between the amount of hydrogen sulfide adsorbed and the amount of water adsorbed in samples of the present compositions in accordance with the present invention.

The breakthrough capacities are reported per gram of an adsorbent and per a unit volume of the bed. The last values are important for practical applications. Apparently, the capacity of ZrG-1 and ZrG-2 are about 20% higher than those on zirconium hydroxide. When only the compositions are considered, a perfect linear relationship between the amount of $H_2S$ adsorbed and the ability of the materials to retain water is revealed as shown in FIG. 12. Similar trends were observed for other adsorbents. The fact that the adsorption on ZrA does not follow that trend and less $H_2S$ is adsorbed in spite of higher hydrophilicity suggests that the mechanism of reactive adsorption on this material differs from that of the present compositions. Less water adsorption on the compositions was expected since graphite oxide layers should increase the surface hydrophobicity compared to pure hydroxide.

Figure 13:
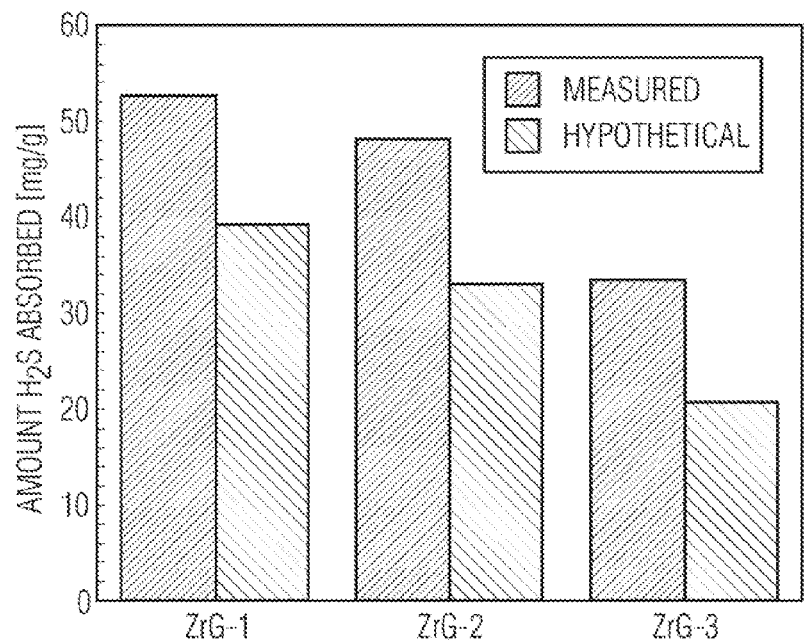
FIG. 13 shows a comparison of measured and hypothetical hydrogen sulfide adsorption capacities of samples of the present compositions in accordance with the present invention.

The effect of composition formation on the capacity is shown in FIG. 13 where the measured and hypothetical capacities are compared. The latter values were calculated assuming the physical mixture of the components and taking into account the $H_2S$ adsorption capacity of each one of them (zero for GO). The results demonstrate the synergetic effect of the process of the composition formation. The percent of improvement increases with an increase in the content of graphite oxide.

Interestingly, contrary to the behavior observed when adsorption of $SO_2$ on such materials was analyzed, no changes in the surface pH were observed after exposure to the challenge gas. This can be explained only by formation of sulfur or sulfidation of zirconium hydroxide surface. The latter can happen via replacement of terminal hydroxyl groups with $SH^-$ ions.

In the case of adsorption of $SO_2$ on hydrous zirconia, zirconium sulfite, $Zr(SO_3)_2$ was indicated as the major reaction product. In that case hydroxyl groups were indicated as involved in surface reaction. If we assume that terminal hydroxyl groups associated with zirconium hydroxide are also active in reaction with $H_2S$ and that all $H_2S$ reacted with $Zr(OH)_4$, "utilization" of surface chemistry would be 10%, 12%, 12% and 6% for ZrA, ZrG-1, ZrG-2 and ZrG-3, respectively. Since those numbers are surprisingly similar to those observed in the case of $SO_2$ adsorption they must represent the numbers of available adsorption centers in the present compositions.

The analysis of the porosity supports the replacement of terminal OH with $SH^-$ ions. Practically no changes in the porosity are detected as shown by the parameters of porous structure calculated from nitrogen adsorption isotherms listed in Table 5 as follows.

TABLE 5

| Sample | $S_{BET}$ (m²/g) | $V_t$ (cm³/g) | $V_{meso}$ (cm³/g) | $V_{mic}$ (cm³/g) | $V_{mic}/V_t$ |
|---|---|---|---|---|---|
| ZrA | 230 | 0.131 | 0.071 | 0.060 | 0.46 |
| ZrA-EM | 216 | 0.127 | 0.073 | 0.054 | 0.43 |
| ZrG-1 | 201 | 0.119 | 0.067 | 0.052 | 0.44 |
| ZrG-1-EM | 210 | 0.116 | 0.059 | 0.057 | 0.49 |
| ZrG-2 | 219 | 0.150 | 0.099 | 0.051 | 0.34 |
| ZrG-2-EM | 203 | 0.130 | 0.081 | 0.049 | 0.38 |
| ZrG-3 | 141 | 0.115 | 0.079 | 0.036 | 0.31 |
| ZrG-3-EM | 143 | 0.124 | 0.090 | 0.034 | 0.27 |

The alternative explanation to the replacement of terminal OH with sulfur/sulfate ion would be the total conversion of $H_2S$ to $SO_2$ (detected in the outlet gas), its physical adsorption and then removal during outgassing. Nevertheless, since no changes in the pH were observed for the exhausted samples we exclude this hypothesis.

Apparently with an increase in the content of GO the total porosity of the compositions decreases and this has to have a negative effect on both, $H_2S$ and water adsorption on these materials. As discussed previously, the presence of GO changes the chemical character of the materials and introduces porosity originating from the interface between the GO and zirconium hydroxide units. These pores might have a strong adsorption potential and might be responsible for an increase in the $H_2S$ adsorption. Also the specific chemistry and an increase in surface basicity associated with oxygen shared with GO and zirconium hydroxide might play a role in the reactions with the adsorbate.

Figure 14A:
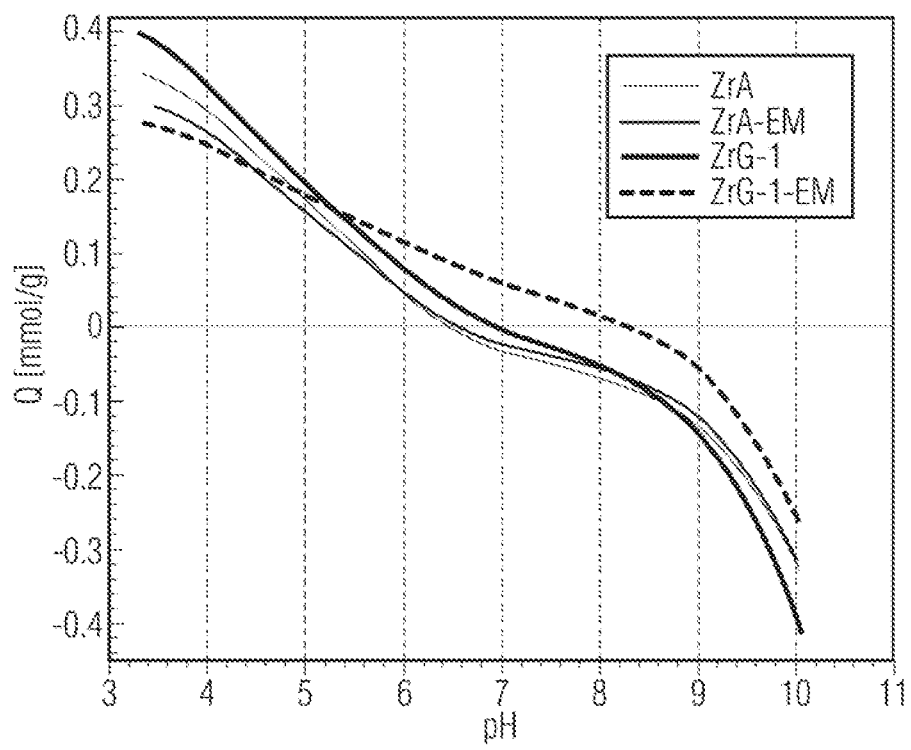
FIGS. 14A and 14B show proton uptake curves for species present on the surface of initial and exhausted samples of the present compositions in accordance with the present invention.
Figure 14B:
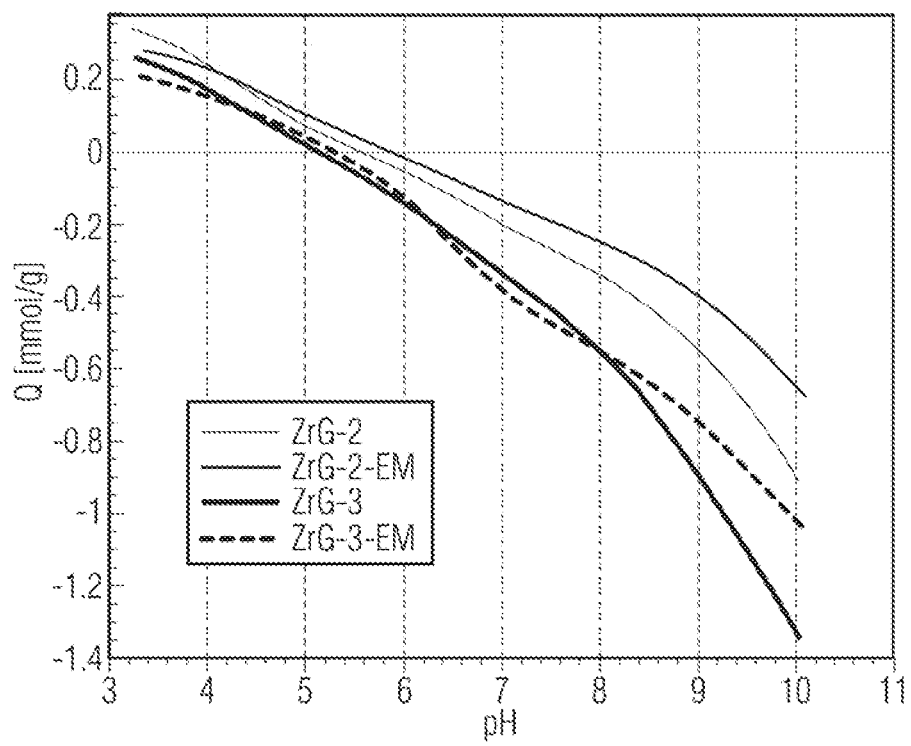

The analysis of the potentiometric titration results confirms the involvement of oxygen containing groups of the compositions in the enhancement of $H_2S$ adsorption. A comparison of the proton adsorption curves before and after exposure to $H_2S$ as shown FIGS. 14A and 14B indicates that the number of groups dissociated at the pH higher than 7 significantly decreased for ZrG-2-EM and ZrG-3-EM. For the ZrG-1-EM on which the adsorption was the highest the decreasing trend is seen almost in the whole pH range. On the other hand, no visible changes are seen for the ZrA, even though a significant amount of $H_2S$ is adsorbed there.

The $pK_a$ values of the detected species and their numbers are listed in Table 6 as follows.

TABLE 6

| Sample | pKa 3-4 | pKa 4-5 | pKa 5-6 | pKa 6-7 | pKa 7-8 | pKa 8-9 | pKa 9-10 | pKa 10-11 | All |
|---|---|---|---|---|---|---|---|---|---|
| GO | 3.90 (0.214) | 4.97 (0.172) | 5.84 (0.217) | 6.90 (0.492) | | 8.24 (0.428) | 9.11 (0.429) | 10.09 (0.887) | 2.839 |
| ZrA | | 4.30 (0.196) 4.90 (0.017) | 5.91 (0.198) | | 7.91 (0.030) | | 9.10 (0.071) | 10.14 (0.426) | 0.938 |
| ZrA-EM | | 4.38 (0.185) | 5.88 (0.167) | | 7.73 (0.026) | 8.92 (0.059) | | 10.12 (0.462) | 0.899 |
| ZrG-1 | | 4.00 (0.193) | 5.10 (0.132) | 6.31 (0.136) | | 8.56 (0.102) | | 10.15 (0.637) | 1.200 |
| ZrG-1-EM | | 4.32 (0.121) | 5.38 (0.031) | 6.25 (0.086) | 7.91 (0.048) | | 9.19 (0.074) | 10.14 (0.452) | 0.812 |
| ZrG-2 | | 4.00 (0.266) | 5.10 (0.137) | 6.54 (0.213) | 7.58 (0.085) | 8.74 (0.276) | | 10.11 (0.732) | 1.709 |
| ZrG-2-EM | | 4.21 (0.187) | 5.31 (0.107) | 6.13 (0.072) 6.87 (0.134) | 7.94 (0.077) | 8.97 (0.193) | | 10.15 (0.486) | 1.256 |
| ZrG-3 | | 4.00 (0.222) | 5.07 (0.136) | 6.34 (0.281) | 7.07 (0.052) 7.79 (0.149) | 8.84 (0.534) | | 10.15 (0.678) | 2.052 |
| ZrG-3-EM | | 4.09 (0.139) | 5.12 (0.124) | 6.55 (0.461) | | 8.45 (0.210) | 9.10 (0.068) 9.83 (0.441) | | 1.443 |

The results apparently indicate that the exposure to $H_2S$ changes the chemistry of the compositions, even thought the surface pH representing the average number and strength of surface groups is not affected visibly as shown in Table 4. In the present compositions, the total number of groups decreased about 30% even thought the content of GO, which is responsible for the chemical surface heterogeneity, ranges from 5 wt %-30 wt %. This indicates the strongest synergetic effect of the new structure/chemistry in the case of ZrG-1 which performance indeed was the best. Interestingly, compared to the pure ZrA, the groups originating from only 5 wt % of GO have to have a significant influence on the adsorption capacity. It is possible that the high dispersion of GO results in the availability of the epoxy and carboxylic groups. Those species, especially in the presence of acidic catalyst such as zirconia, react with $H_2S$ forming the thio-derivatives:

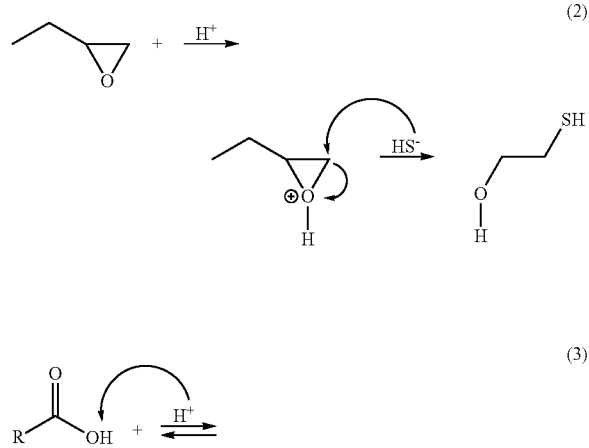

(2)

(3)

-continued

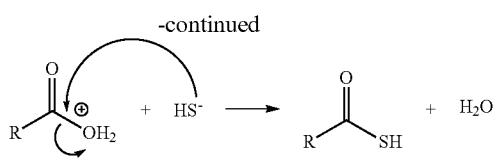

These reactions change the chemical character of the surface. On the other hand, in the case of ZrA, when the exhausted material is immersed in water the adsorbed HS⁻ which replaced terminal OH is replaced back with —OH groups, which results in no visible changes in the surface chemistry. Since the dissociation constant of HS⁻ is beyond our experimental pH window, the presence of these ions cannot be detected. If we assume that one —OH-based adsorption center specific for the composition is involved in reaction with $H_2S$ the decrease in the number of groups can be linked to 25%, 32% and 63% of total $H_2S$ adsorbed on these materials. This trend follows almost linearly ($R^2$=0.97) the trend in the increase in the content of GO. This supports the involvement of the GO chemistry in retention of hydrogen sulfide. When adsorption of GO on pure GO was tested the reactions (2) and (3) did not take place since the acidic catalysts was not present in the system.

An analysis of sulfur content after the breakthrough experiment detected by X-ray fluorescence (XRF) and after extraction with water (ratio 1:40) as compared to those on the untreated exhausted samples was performed to confirm the hypothesis that some adsorbed HS" groups can be replaced by —OH when immersed in water. The results are presented in Table 7.

TABLE 7

| Sample | $S_{H2S}$ [wt. %] | [a]$S_{XRF}$ [wt. %] | [b]$S_{XRF}$ [wt. %] | $S_{H2S}/S_{XRF}$ |
|---|---|---|---|---|
| ZrA | 3.9 | 3.8 | 1.8 | 1.03 |
| ZrG-1 | 5.0 | 4.6 | 2.0 | 1.09 |

TABLE 7-continued

| Sample | $S_{H2S}$ [wt. %] | $^{a}S_{XRF}$ [wt. %] | $^{b}S_{XRF}$ [wt. %] | $S_{H2S}/S_{XRF}$ |
|---|---|---|---|---|
| ZrG-2 | 4.5 | 3.7 | 1.6 | 1.22 |
| ZrG-3 | 3.1 | 2.7 | 1.5 | 1.15 |

$^{a}$Sulfur content after the breakthrough experiment
$^{b}$Sulfur content after extraction in water The results show that about 50% less sulfur is left on the surface after that treatment.

As shown in Table 7, the sulfur content on the surface of our materials detected using XRF is only slightly smaller than that expected based on the breakthrough experiments. It can be due to the fact that some $H_2S$ had to get oxidized to $SO_2$ since its presence was detected in the outlet gas. Comparison of the amounts adsorbed and detected supports the earliest conclusion about the lowest conversion of $H_2S$ to $SO_2$ on ZrG-1 compared to other compositions and thus about the best performance of this sample from the point of view of $H_2S$ reactive adsorption.

Thermal analysis carried out on the exhausted samples revealed only the presence of physically adsorbed water removed from the surface at about 100° C. In fact, if zirconium sulfides were formed they would be thermally stable since their decomposition temperature is ~1550° C. Nevertheless the potentiometric titration results on exhausted samples exclude their formation. Interestingly no peak associated with the reactions of $SO_2$ with terminal groups was observed, which suggests that in the competition for the adsorption centers between $HS^-$ and $SO_2$ the former was the winner and latter was just removed from the system with the gas stream.

The FTIR analysis performed on our samples shows no differences between the spectra for the initial and exhausted samples. It excludes formation of sulfites and sulfates. Unfortunately, the vibration from $HS^-$ is expected to be very weak and they are not detected.

Zirconium hydroxide is usually envisioned as two-dimensional square lattice, which is connected with each other by bridging hydroxyl groups with coordinated water. GO on the other hand consists of graphene layers with epoxy and —OH groups attached to the basal planes and carboxylic and sulfonic groups existing at the edges of these layers. As it was discussed elsewhere, those —OH groups of graphene layers dispersed in water can work as a bridging groups resulting in chemical bonds between the two components of the mixture. Besides this, hydrogen bonding between the units of hydrous zirconia and the epoxy groups of GO can also take place during composition formation. Those new groups are hypothesized to increase the basicity of the compositions and change the $pK_a$ of some bridging groups being in their vicinity.

As shown previously, increased basicity, especially when the water is present, causes the shift in the $H_2S$ dissociation toward the products. Then $HS^-$ produced can be oxidized by oxygen from air either to sulfur or $SO_2$. Since the TA analysis exclude the presence of sulfur or sulfides the $HS^-$ must replace OH immediately in the terminal groups or be associated with the oxygen groups of the GO component. The latter is likely visible in the decrease in the number of groups having $pK_a$ in strongly and weakly acidic ranges. The new porosity created in the interface between two components can also enhance adsorption. Some $HS^-$ got oxidized to $SO_2$. It usually happens when their concentration is not too high and the relatively low pH of compositions provides this environment.

The $H_2S$ likely attacks the terminal OH groups of hydrous zirconia and the reactions occurring between the hydrous zirconia component and $H_2S$ can be described as:

$$Zr(OH)_4H_2O \rightarrow Zr(OH)_3(HS)H_2O+H_2O \rightarrow Zr(OH)_2(HS)_2H_2O+H_2O \quad (3)$$

In the present compositions the mechanism is more complex. Hydrous zirconia is attached to the GO via sharing the common oxygen originating from OH group of GO. As in the case of pure zirconium hydroxide, the replacement of terminal OH with $SH^-$ takes place. Sharing oxygen with GO changed the chemical environment of the other bridging and terminal groups of the $Zr(OH)_4$ layer attached to the GO. This results in an observed increase in surface basicity.

The effect on the next layers should be less pronounced and the mechanism of adsorption of $SH^-$ on them should remind that one on pure ZrA. Reaction with epoxy/carboxylic groups and an incorporation of $SH^-$ via covalent bonds caused that the changes in surface acidity detected by potentiometric titration in the case of exhausted compositions are permanent as opposite to those for hydrous zirconia. Since small amounts of $SO_2$ were detected, some $SH^-$ were oxidized by atmospheric oxygen.

Conclusions:

The results presented herein demonstrate that new features of hydrous zirconia/GO compositions, as result of the chemical synergy, enhance reactive adsorption of hydrogen sulfide. $H_2S$ is retained on the surface via replacement of terminal —OH groups of hydrous zirconia and via reaction of $HS^-$ with epoxy and carboxylic groups of graphite oxide layers. Some $HS^-$ are oxidized to $SO_2$ and removed from the system.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A composition comprising a mixture of hydrous metal oxide and graphite oxide.

2. The composition of claim 1, wherein the hydrous metal oxide is hydrous zirconia.

3. The composition of claim 1, wherein the graphite oxide is graphene oxide.

4. The composition of claim 1, wherein the mixture is porous.

5. The composition of claim 4, wherein the porous mixture further comprises an average pore size of less than 100 nm.

6. The composition of claim 5, wherein the average pore size is in the range of from about 2 nm to 10 nm.

7. The composition of claim 1, wherein the mixture comprises a surface area of at least 100 $m^2g^{-1}$.

8. The composition of claim 7, wherein the mixture comprise's a surface area of from about 100 $m^2g^{-1}$ to 1000 $m^2g^{-1}$.

9. The composition of claim 1, wherein the mixture comprises a pH value of from about 3 to 9.

10. The composition of claim 9, wherein the pH value is 6 to 7.

11. The composition of claim 1, wherein the graphite oxide is present in an amount sufficient to substantially enhance removal of toxic industrial chemicals.

12. The composition of claim 11, wherein the amount of the graphite oxide is at least 0.01% by weight based on the total weight of the composition.

13. The composition of claim 12, wherein the amount of the graphite oxide is in the range of from about 0.1% by weight to 90% by weight based on the total weight of the composition.

14. The composition of claim 13, wherein the amount of the graphite oxide is in the range of from about 1% by weight to 80% by weight based on the total weight of the composition.

15. The composition of claim 14, wherein the amount of the graphite oxide is in the range of from about 5% by weight to 50% by weight based on the total weight of the composition.

16. The composition of claim 1, wherein the mixture is in a form selected from the group consisting of spheres, pellets, rods, molding, monoliths and combinations thereof.

17. A method of removing toxic compounds from air, said method comprising the step of passing the air in contact with the composition of claim 1.

18. A method of making a composition, said method comprising the step of forming a mixture of hydrous metal oxide and graphite oxide.

19. The method of claim 18, wherein the hydrous metal oxide is zirconium hydroxide.

20. The method of claim 19, wherein the forming step further comprises:
   dispersing graphite oxide in a solution of a zirconium salt; and
   adding slowly a stoichiometric amount of a solution of a strong base to yield a precipitate comprising zirconium hydroxide and graphite oxide.

21. The method of claim 20, wherein the zirconium salt is zirconium chloride.

22. The method of claim 20, wherein the strong base is sodium hydroxide.

23. The method of claim 18, wherein the forming step further comprises:
   adding graphite oxide to a strong basic solution to yield a suspension;
   adding a metal salt solution to the suspension to yield the mixture of hydrous metal oxide and graphite oxide.

24. The method of claim 23, wherein the strong basic solution is sodium hydroxide solution.

25. The method of claim 23, wherein the metal salt solution is zirconium (IV) chloride solution.

26. The method of claim 23, wherein the metal salt solution addition step is carried out by titration at a specified rate.

27. The method of claim 23, further comprising the step of washing the mixture of hydrous metal oxide and graphite oxide until no trace of salt ion remains.

28. The method of claim 23, further comprising the step of washing the mixture of hydrous metal oxide and graphite oxide until pH is neutral.

29. The method of claim 23, further comprising the steps of:
   centrifuging the mixture of hydrous metal oxide and graphite oxide; and
   drying the mixture.

30. The method of claim 18, wherein the hydrous metal oxide is hydrous zirconia.

31. The method of claim 18, wherein the graphite oxide is graphene oxide.

32. The method of claim 18, further comprising forming the mixture of hydrous metal oxide and graphite oxide into a member selected from the group consisting of spheres, pellets, rods, molding, monoliths and combinations thereof.

* * * * *